(12) United States Patent
Liu et al.

(10) Patent No.: US 7,516,121 B2
(45) Date of Patent: Apr. 7, 2009

(54) EFFICIENT EVALUATION OF QUERIES USING TRANSLATION

(75) Inventors: Zhen Hua Liu, San Mateo, CA (US);
Muralidhar Krishnaprasad, Fremont, CA (US); Anand Manikutty, Foster City, CA (US); James Warner, Mountain View, CA (US); Hui X. Zhang, Fremont, CA (US); Vikas Arora, San Francisco, CA (US); Susan M. Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 126 days.

(21) Appl. No.: 10/948,523

(22) Filed: Sep. 22, 2004

(65) Prior Publication Data
US 2005/0289125 A1    Dec. 29, 2005

Related U.S. Application Data

(60) Provisional application No. 60/582,706, filed on Jun. 23, 2004, provisional application No. 60/599,652, filed on Aug. 5, 2004, provisional application No. 60/599,319, filed on Aug. 6, 2004.

(51) Int. Cl.
*G06F 17/30* (2006.01)
(52) U.S. Cl. ..................... 707/3; 707/2; 707/4
(58) Field of Classification Search .................. 707/100
See application file for complete search history.

(56) References Cited

U.S. PATENT DOCUMENTS 5,404,513 A    4/1995    Powers et al.
5,680,614 A    10/1997   Bakuya et al.
5,878,410 A    3/1999    Zbikowski et al.
5,974,407 A    10/1999   Sacks
5,999,941 A    12/1999   Andersen
6,012,067 A    1/2000    Sarkar
6,055,544 A    4/2000    DeRose et al.

(Continued)

FOREIGN PATENT DOCUMENTS

EP    1 241 589 A2    9/2002

(Continued)

OTHER PUBLICATIONS

Peng, Feng et al., "XPath queries on streaming data", 2003, ACM Press, pp. 431-442.

(Continued)

*Primary Examiner*—Truong Cam Y
*Assistant Examiner*—Shyue Jiunn Hwa
(74) *Attorney, Agent, or Firm*—Hickman Palermo Truong & Becker LLP

(57) ABSTRACT

Techniques are provided for processing a query including receiving the query, where the query specifies certain operations; determining that the query includes a first portion in a first query language and a second portion in a second query language; generating a first in-memory representation for the first portion; generating a second in-memory representation for the second portion; generating a third in-memory representation of the query based on the first in-memory representation and the second in-memory representation; and performing the certain operations based on the third in-memory representation.

64 Claims, 3 Drawing Sheets

U.S. PATENT DOCUMENTS

| | | | |
|---|---|---|---|
| 6,128,610 | A | 10/2000 | Srinivasan et al. |
| 6,141,655 | A | 10/2000 | Johnson et al. |
| 6,199,195 | B1 | 3/2001 | Goodwin et al. |
| 6,208,993 | B1 | 3/2001 | Shadmon |
| 6,236,988 | B1 | 5/2001 | Aldred |
| 6,240,407 | B1 | 5/2001 | Chang et al. |
| 6,253,195 | B1* | 6/2001 | Hudis et al. .............. 707/2 |
| 6,263,332 | B1 | 7/2001 | Nasr et al. |
| 6,279,007 | B1 | 8/2001 | Uppala |
| 6,343,287 | B1 | 1/2002 | Kumar et al. |
| 6,356,920 | B1 | 3/2002 | Vandersluis |
| 6,366,934 | B1 | 4/2002 | Cheng et al. |
| 6,370,537 | B1 | 4/2002 | Gilbert et al. |
| 6,418,448 | B1 | 7/2002 | Sarkar |
| 6,438,540 | B2 | 8/2002 | Nasr et al. |
| 6,449,620 | B1 | 9/2002 | Draper et al. |
| 6,470,344 | B1 | 10/2002 | Kothuri et al. |
| 6,487,546 | B1 | 11/2002 | Witkowski |
| 6,496,842 | B1 | 12/2002 | Lyness |
| 6,510,434 | B1 | 1/2003 | Anderson et al. |
| 6,574,655 | B1 | 6/2003 | Libert et al. |
| 6,584,459 | B1 | 6/2003 | Chang et al. |
| 6,604,100 | B1 | 8/2003 | Fernandez et al. |
| 6,636,845 | B2 | 10/2003 | Chau et al. |
| 6,643,633 | B2 | 11/2003 | Chau et al. |
| 6,654,734 | B1 | 11/2003 | Mani et al. |
| 6,684,204 | B1 | 1/2004 | Lal |
| 6,708,186 | B1 | 3/2004 | Claborn et al. |
| 6,721,727 | B2 | 4/2004 | Chau et al. |
| 6,725,212 | B2 | 4/2004 | Couch et al. |
| 6,772,412 | B2 | 8/2004 | Baba et al. |
| 6,782,380 | B1 | 8/2004 | Thede |
| 6,785,673 | B1 | 8/2004 | Fernandez et al. |
| 6,836,778 | B2 | 12/2004 | Manikutty et al. |
| 6,871,204 | B2 | 3/2005 | Krishnaprasad et al. |
| 6,918,082 | B1 | 7/2005 | Gross et al. |
| 7,028,028 | B1 | 4/2006 | Balmin et al. |
| 7,031,956 | B1 | 4/2006 | Lee et al. |
| 7,043,716 | B2* | 5/2006 | Zimmer et al. .............. 717/107 |
| 7,062,507 | B2 | 6/2006 | Wang et al. |
| 7,072,896 | B2 | 7/2006 | Lee et al. |
| 7,124,137 | B2 | 10/2006 | Lin et al. |
| 7,139,746 | B2 | 11/2006 | Shin et al. |
| 7,181,438 | B1 | 2/2007 | Szabo |
| 2001/0037345 | A1 | 11/2001 | Kiernan et al. |
| 2002/0015042 | A1 | 2/2002 | Robotham et al. |
| 2002/0035606 | A1 | 3/2002 | Kenton |
| 2002/0038358 | A1 | 3/2002 | Sweatt, III et al. |
| 2002/0054090 | A1 | 5/2002 | Silva et al. |
| 2002/0056025 | A1 | 5/2002 | Qui et al. |
| 2002/0073019 | A1 | 6/2002 | Deaton |
| 2002/0087510 | A1 | 7/2002 | Weinberg et al. |
| 2002/0100027 | A1* | 7/2002 | Binding et al. .............. 717/137 |
| 2002/0116371 | A1 | 8/2002 | Dodds et al. |
| 2002/0116457 | A1 | 8/2002 | Eshleman et al. |
| 2002/0120685 | A1 | 8/2002 | Srivastava et al. |
| 2002/0123993 | A1 | 9/2002 | Chau et al. |
| 2002/0124100 | A1 | 9/2002 | Adams |
| 2002/0133484 | A1 | 9/2002 | Chau et al. |
| 2002/0156772 | A1 | 10/2002 | Chau et al. |
| 2002/0169788 | A1 | 11/2002 | Lee et al. |
| 2002/0184401 | A1 | 12/2002 | Kadel, Jr. et al. |
| 2002/0198874 | A1 | 12/2002 | Nasr et al. |
| 2003/0004937 | A1 | 1/2003 | Salmenkaita et al. |
| 2003/0009361 | A1 | 1/2003 | Hancock et al. |
| 2003/0014397 | A1 | 1/2003 | Chau et al. |
| 2003/0028563 | A1 | 2/2003 | Stutz et al. |
| 2003/0033285 | A1 | 2/2003 | Jalali et al. |
| 2003/0065659 | A1 | 4/2003 | Agarwal et al. |
| 2003/0101194 | A1 | 5/2003 | Rys et al. |
| 2003/0140308 | A1 | 7/2003 | Murthy et al. |
| 2003/0154204 | A1 | 8/2003 | Chen-Wright et al. |
| 2003/0158897 | A1 | 8/2003 | Ben-Natan et al. |
| 2003/0182624 | A1 | 9/2003 | Large |
| 2003/0200214 | A1* | 10/2003 | Doole et al. .............. 707/8 |
| 2003/0212662 | A1 | 11/2003 | Shin et al. |
| 2003/0233618 | A1 | 12/2003 | Wan |
| 2004/0006563 | A1 | 1/2004 | Zwiegincew et al. |
| 2004/0015783 | A1* | 1/2004 | Lennon et al. .............. 715/523 |
| 2004/0043758 | A1 | 3/2004 | Sorvari et al. |
| 2004/0064463 | A1 | 4/2004 | Manikutty et al. |
| 2004/0064466 | A1 | 4/2004 | Manikutty et al. |
| 2004/0088415 | A1 | 5/2004 | Chandrasekar et al. |
| 2004/0143581 | A1* | 7/2004 | Bohannon et al. .......... 707/100 |
| 2004/0148278 | A1 | 7/2004 | Milo et al. |
| 2004/0167904 | A1* | 8/2004 | Wen et al. .............. 707/100 |
| 2004/0176958 | A1 | 9/2004 | Salmenkaita et al. |
| 2004/0193575 | A1* | 9/2004 | Chen et al. .............. 707/3 |
| 2004/0199524 | A1 | 10/2004 | Rys et al. |
| 2004/0215600 | A1 | 10/2004 | Aridor et al. |
| 2004/0220912 | A1 | 11/2004 | Manikutty et al. |
| 2004/0220927 | A1 | 11/2004 | Murthy et al. |
| 2004/0221226 | A1 | 11/2004 | Lin et al. |
| 2004/0225680 | A1 | 11/2004 | Cameron et al. |
| 2004/0230667 | A1 | 11/2004 | Wookey |
| 2004/0260691 | A1* | 12/2004 | Desai et al. .............. 707/4 |
| 2004/0267719 | A1 | 12/2004 | Doherty et al. |
| 2004/0267760 | A1* | 12/2004 | Brundage et al. .......... 707/100 |
| 2005/0004892 | A1* | 1/2005 | Brundage et al. .............. 707/3 |
| 2005/0010896 | A1 | 1/2005 | Meliksetian et al. |
| 2005/0022115 | A1* | 1/2005 | Baumgartner et al. ....... 715/513 |
| 2005/0044078 | A1 | 2/2005 | DeVries et al. |
| 2005/0091188 | A1 | 4/2005 | Pal et al. |
| 2005/0097084 | A1 | 5/2005 | Balmin et al. |
| 2005/0102256 | A1 | 5/2005 | Bordawekar et al. |
| 2005/0114314 | A1 | 5/2005 | Fan et al. |
| 2005/0160076 | A1* | 7/2005 | Kanemasa .............. 707/2 |
| 2005/0160108 | A1 | 7/2005 | Charlet et al. |
| 2005/0210002 | A1 | 9/2005 | Pal et al. |
| 2005/0228786 | A1 | 10/2005 | Murthy et al. |
| 2005/0229158 | A1 | 10/2005 | Thusoo et al. |
| 2005/0289125 | A1 | 12/2005 | Liu et al. |
| 2005/0289138 | A1 | 12/2005 | Cheng et al. |
| 2006/0010124 | A1 | 1/2006 | Lucas et al. |
| 2006/0031204 | A1 | 2/2006 | Liu et al. |
| 2006/0224576 | A1 | 10/2006 | Liu |

FOREIGN PATENT DOCUMENTS

| | | |
|---|---|---|
| GB | 2409078 A | 6/2005 |
| WO | WO 00/49533 A2 | 8/2000 |
| WO | WO 01/33433 A1 | 5/2001 |
| WO | WO 01/42881 A2 | 6/2001 |
| WO | WO 42881 A2 | 6/2001 |
| WO | WO 01/059602 A1 | 8/2001 |
| WO | WO 01/61566 A1 | 8/2001 |
| WO | WO 01/65419 A2 | 9/2001 |
| WO | WO 03/027908 A | 4/2003 |

OTHER PUBLICATIONS

Vion-Dury, Jean-Yves, "XPath on left and right sides of rules: toward compact XML tree rewriting through node patterns", 2003, ACM Press, pp. 19-25.

Daniele Braga et al., "A Graphical Environment to Query XML Data with Query," Proceedings of the Fourth International Conference on Web Information Systems Engineering (WISE '03), 2003, IEEE, 10 pages.

International Preliminary Examination Report, Application No. PCT/US03/35551, Oct. 8, 2004, pp. 1-17.

Written Opinion, Application No. PCT/US03/35551, Nov. 10, 2004, 6 pages.

Current claims in PCT/US03/35551, pp. 1-4.

"A Performance Evaluation of Storing XML Data in Relational Database Management Systems"—Latifur Khan and Yan Rao—ACM-2001 (pp. 31-38).
"From XML Schema to Relations: A Cost-Based Approach to XML Storage"—Bell Laboratories: Philip Bohannon, Juliana Freire, Prasan Roy and Jerome Simeon—IEEE—2002—Proceedings of the 18th International Conference on Data Engineering (ICDE '02), pp. 1-28.
"SRQL: Sorted Relational Query Language"—Ragu Ramakrishnan, Donko Donjerkovic, Arvind Ranganathan, Kevin S. Beyer and Muralidhar Krishnaprasad—Jul. 1-3, 1998, IEEE, pp. 84-95.
"Oracle8i—The XML Enabled Data Management System"—Oracle Corporation: Sandeepan Banerjee, Vishu Krishnamurthy, Muralidhar Krishnaprasad and Ravi Murthy—Mar. 2000, IEEE, pp. 561-568.
Chen, Ruey-Shun et al., "Developing an XML framework for metadata system", Trinity College Dublin, Proc. of the 1st Inter. Sympo. on Information and Communications, pp. 267-272.
Manolescu, Dragos, Review of "Metadata solutions: using metamodels, repositories, XML, and enterprise portals to generate information on demand by Adrienne Tannenbaum", Mar. 2003, ACM Press, vol. 38, Issue 2, p. 38.
International Preliminary Examination Report, Application No. PCT/US02/30783, Apr. 1, 2004, 15 pages.
Jayavel Shanmugasundaram, et al., "Querying XML Views of Relational Data," Proceedings of the 27th Very Large Databases Conference, Rome, Italy, Sep. 2001, pp. 261-270.
Current claims in PCT/US02/30783, pp. 1-8.
R. Bourret, et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.
Scott Vorthmann, et al., "Beyond Schemas, Schema Adjuncts and the Outside World," Markup Languages, Online!, vol. 2, No. 3, Jun. 2000, pp. 1-8.
Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.
Hansrudi Noser, et al., "Dynamic 3D Visualization of Database-Defined Tree Structures on the WWW by Using Rewriting Systems," 2000, IEEE, XP-002262516, pp. 247-254.
Sushil Jajodia, et al., "Toward a Multilevel Secure Relational Data Model," ACM, 1991, 8393 SIGMOD Record, Jun. 20, 1991, No. 2, New York, US, XP 000364619, pp. 50-59.
Josephine Cheng, et al., "IBM DB2 XML Extender, An end-to-end solution for storing and retrieving XML documents.," IEEE, ICDE '00 Conference, San Diego, Feb. 2000, 128 pages.
Jim Melton, "ISO-ANSI Working Draft, XML-Related Specifications (SQL/XML)," WG3: DRS-020, H2-2002-365, Aug. 2002, 154 pages.
Oracle Corporation, "Oracle9i XML Database Developer's Guide—Oracle XML DB," Release 2 (9.2), Mar. 2002, Part No. A96620-1, pp. 10-1-10-54.
W3C, "XML Schema Part 1: Structures," W3C Recommendation, May 2, 2001, retrieved from the internet:<http://www.w3.org/TR/2001/REC-xmlschema-1-20010502/>, retrieved on Apr. 14, 2005, pp. 1-186.
W3C, "XML Schema Part 2: Datatypes," W3C Recommendation, May 2, 2001, retrieved from the internet:<http://www.w3.org/TR/2001/REC-xmlschema-2-20010502/>, retrieved on Apr. 14, 2005, pp. 1-138.
Dayen, I., "Storing XML in Relational Databases", XML.com, XP-002275971(1998-2004), pp. 1-13.
Funderbunk, J. et al., "XML programming with SQL/XML and XQuery", IBM Systems Journal, XP-002295973 (2002), pp. 642-665.
Hierarchical Queries, XP-002295972, pp. 8-3 to 8-7.
International Searching Authority, "Notification of Transmittal of the International Search Report and the Written Opinion of the International Authority, or the Declaration," Nov. 2, 2004, PCT/US2004/010018, 14 pages.
PCT/US2004/010018—current claims.
W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.
W3C, "XML Path Langauge (XPath) 2.0," W3C Recommendation, Working Draft, Oct. 29, 2004, retrieved from the internet:<http://www.w3.org/TR/2004/WD-xpath20-20041029>, retrieved on Apr. 14, 2005, pp. 1-111.
W3C, "XML Syntax for XQuery 1.0 (XQueryX)," W3C Recommendation, Working Draft, Dec. 19, 2003, retrieved from the internet:<http://www.w3.org/TR/2003/WD-xquery-20031219>, retrieved on Apr. 14, 2005, pp. 1-55.
Schmidt et al.—"Efficient Relational Storage and Retrieval of XML Documents"—CWI, The Netherlands (pp. 1-6).
"Oracle 9i Project XDB"—The XML Database—Oracle—2001 (pp. 1-18).
Lawrence et al. "Integrating Relational Database Schemas Using a Standardized Dictionary"—2001—ACM (pp. 225-230).
McHugh, Jason et al., "Query Optimization for XML", XP-002333353, Proceedings of the 25th VLDB Conference (1999) pp. 315-326.
Yoshikawa, Masatoshi et al., "XRel: A Path-Based Approach to Storage and Retrieval of XML Documents Using Relational Databases", XP-001143686, ACM Transactions on Internet Technology (2001), pp. 110-141.
Notification of Transmittal of the International Search Report and the Written Opinion of the International Searching Authority, or the Declaration received from International application No. PCT/US2005/011762.
Pending claims from International application No. PCT/US2005/011762.
International Preliminary Examining Authority, "Notification Concerning Informal Communications with the Applicant," PCT/US2005/021259, dated May 11, 2006, 5 pages.
Claims dated Apr. 25, 2006, PCT/US2005/021259, 8 pages.
International Searching Authority, "Notification of Transmittal of the International Search Report and the Written Opinion of the International Searching Authority, or the Declaration," PCT/US2005/021259, dated Nov. 24, 2005, 13 pages.
Claims as filed with the application, PCT/US2005/021259, 15 pages.
Choi, Byron et al., "The XQuery Formal Semantics: A Foundation for Implementation Optimization," May 31, 2002, IEEE XP-002353605, 15 pages.
Kang, Ji-Hoon et al., "An XQuery Engine for Digital Library Systems that support XML data," Proceedings of the 2004 International Symposium on Application and the Internet Workshops, IEEE XP-0010684128, 5 pages.
Murthy, Ravi et al., "XML Schemas in Oracle XML DB," Proceedings of the 29th VLDB Conference, 2003, IEEE XP-002353604, pp. 1009-1018.
Zhang, Hui et al., "XQuery rewriting at the relational algebra level," Computer Systems Science and Engineering, vol. 18, No. 5, Sep. 2003, IEEE XP-009056809, pp. 241-262.
Zhang, Xin et al., "Honey, I Shrunk the XQuery?—An XML Algebra Optimization Approach," Submission for WIDM'02, IEEE XP-002316448, 14 pages.
European Patent Office, "Communication Pursuant to Article 96(2) EPC," App. No. 01 970 715.7 (50277-2177), sated Jul. 19, 2006, 8 pages.
Amended Claims (50277-2177), App. No. 01 970 715.7, 13 pages.
Florescu, Daniela et al., "A Performance Evaluation of Alternative Mapping Schemes for Storing XML Data In A Relational Database," Inria Rocquencourt P Project Rodin—Rapport de Recherche, May 1999, pp. 1-31.
Chen, Cindy Xinmin, et al., "XML Queries SQL," Proceedings of the First International Conference on Web-Age Information Management, ISBN: 3-540-67627-9, 8 pages.
Cheng, Josephine, et al., "XML and DB2," 16th International Conference on Data Engineering, May 2000, 5 pages.
Australian Office Action; Examiner's first report on patent application No. 2001290693, dated Jun. 27, 2006, 4 pgs.
Australian Application No. 2001290693—current claims, 17 pgs.

IP Australia, "Examiner's Report No. 2,"Patent App. 2001290693, received Mar. 8, 2007, 2 pages.

Current Claims Patent App. 2001290693 (50277-2175), 7 pages.

Cooper, et al., "A Fast Index for Semistructured Data," Proceedings of the International Conference on Very Large Data Bases, 2001, pp. 341-350, XP002303292.

McHugh, Jason, et al. "Indexing Semistructured Data," Stanford Science Department, 1998, XP-002248313, pp. 1-21.

International Searching Authority,"Notification of Transmittal of the International Search Report and the Written Opinion of the International Searching Authority, or the Declaration," PCT/US2005/011763, Received Aug. 3, 2005, 10 pages.

International Preliminary Examining Authority, "Notification of Transmittal of the International Preliminary Report on Patentability," PCT/US2005/011763, received May 15, 2006, 10 pages (including 3 pages of claims).

Katz, Howard et al., "Integrating XQuery and Relational Database Systems," Chapter 7—*XQuery from the Experts: A Guide to the W3C XML Query Language*, Addison Wesley Professional, Aug. 22, 2003, ISBM 978-0-321-18060-5, pp. 353-391.

Zemke, Fred, "XMLQuery," Change Proposal, ISO/IEC JTC1/SC32 WG3:SIA-nnn ANSI NCITS H2-2004-02lrl, Mar. 14, 2004, 29 pages.

Gennick, Jonathan, "SQL in, XML out", May/Jun. 2003, Oracle Magazine, 5 pages.

Office Action from China for foreign patent application No. 200480011704.3 dated Feb. 29, 2008 (6 pgs).

Current claims in China for foreign patent application No. 200480011704.3 (4 pgs).

Oracle 9I-XML Database Developer's Guide-Oracle, XML DB, Release 2(9.2), Part No. A96620-02, Part IV Chapter 10, 10-1~10-21, Shelley Higgins (24 pgs).

Australian Government, "Examiner's first report on patent application No. 2007229359", received Mar. 5, 2008, 2 pages.

Claims, patent application No. 2007229359, 8 pages.

Australian Government, "Examiner's first report on patent application No. 2007229358", received Mar. 5, 2008, 2 pages.

Claims, patent application No. 2007229358, 8 pages.

Damiani, Ernesto, et al., "Securing XML Documents", LNCS 1777, Mar. 2000, 15 pages.

Cheng, Josephine, et al., "IBM XML Extender An End to End solution for storing and retrieving XML Documents", IBM Silicon Valley, Copyright IEEE, Feb. 2000, 11 pages.

Damiani, Ernesto, et al., "Design and Implementation of an access control processor for XML documents", Computer Networks 33 (2000), Jun. 2000, 17 pages.

Rollman, Rich, "SQL Server 2000 XML Enhancements", Microsoft Corp., Powerpoint Presentation at Microsoft TechEd, Jun. 2000, 42 pages.

Bourret, R et al., "A Generic load/extract utility for data transfer between XML documents and relational databases", IEEE Jun. 2000, 11 pages.

"Notice of Allowance and Fee Due" received in U.S. Appl. No. 10/944,170 dated Apr. 7, 2008, 8 pages.

International Preliminary Examining Authority, "Notification of Transmittal of the International Preliminary Report on Patentability," PCT/US2005/021259, dated Feb. 2, 2007, 9 pages.

Claims, PCT/US2005/021259, dated Nov. 30, 2006, 8 pages (attached).

Rys, Michael et al., "Integrating XQuery and Relational Database Systems," Chapter 7—*XQuery from the Experts: A Guide to the W3C XML Query Language*, Addison Wesley Professional, Aug. 22, 2003, ISBN 978-0-321-18060-5, pp. 353-391.

* cited by examiner

EFFICIENT EVALUATION OF QUERIES USING TRANSLATION

CROSS REFERENCE TO RELATED APPLICATIONS; PRIORITY CLAIM

This application claims benefit of Provisional Application Ser. No. 60/582,706, filed Jun. 23, 2004, entitled "TECHNIQUES FOR PROCESSING XQUERY QUERIES IN A RELATIONAL DATABASE MANAGEMENT SYSTEM," by Zhen Hua Liu et al, the entire contents of which are incorporated by reference for all purposes as if originally set forth herein, under 35 U.S.C. § 119(e) and is referred to herein as to '706.

This application claims benefit of U.S. Patent Application Ser. No. 60/599,652 entitled "PROCESSING QUERIES AGAINST ONE OR MORE MARKUP LANGUAGE SOURCES," filed by Zhen Hua Liu et al. on Aug. 5, 2004, the contents of which are herein incorporated by reference for all purposes as if originally set forth herein, under 35 U.S.C. § 119(e) and is referred to herein as to '652.

This application claims benefit of Provisional Application Ser. No. 60/599,319, filed Aug. 6, 2004, entitled "EFFICIENT EVALUATION OF QUERIES USING TRANSLATION," by Zhen Hua Liu et al, the entire contents of which are incorporated by reference for all purposes as if originally set forth herein, under 35 U.S.C. § 119(e) and is referred to herein as '319.

This application is related to U.S. patent application Ser. No. 10/259,278, entitled "MECHANISM FOR MAPPING XML SCHEMAS TO OBJECT-RELATIONAL DATABASE SYSTEMS," filed by Ravi Murthy et al. on Sep. 27, 2002, the contents of which are herein incorporated by reference for all purposes as if originally set forth herein, referred to herein as to '278.

This application is related to U.S. patent application Ser. No. 10/428,878, entitled "TECHNIQUES FOR REWRITING XML QUERIES DIRECTED TO RELATIONAL DATABASE CONSTRUCTS," filed by Anand Manikutty et al. on May 1, 2003, the contents of which are herein incorporated by reference for all purposes as if originally set forth herein, referred to herein as to '878.

This application is related to U.S. patent application Ser. No. 10/428,443, entitled "TECHNIQUES FOR RETAINING HIERARCHICAL INFORMATION IN MAPPING BETWEEN XML DOCUMENTS AND RELATIONAL DATA," filed by Ravi Murthy et alon May 1, 2003, the contents of which are herein incorporated by reference for all purposes as if originally set forth herein, referred to herein as to '443.

This application is related to U.S. patent application Ser. No. 09/949,020, entitled "METHOD AND APPARATUS FOR XML VISUALIZATION OF A RELATIONAL DATABASE AND UNIVERSAL RESOURCE IDENTIFIERS TO DATABASE DATA AND METADATA," naming as inventors Muralidhar Krishnaprasad et al., filed Sep. 6, 2001, the contents of which are herein incorporated by reference for all purposes as if originally set forth herein, referred to herein as to '020.

This application is related to U.S. patent application Ser. No. 09/948,949, filed together herewith, entitled "APPARATUS AND METHOD FOR MAPPING RELATIONAL DATA AND METADATA TO XML," naming as inventors Muralidhar Krishnaprasad et al., filed 6 Sep. 2001, the contents of which are herein incorporated by reference for all purposes as if originally set forth herein, referred to herein as to '949.

This application is related to U.S. patent application Ser. No. 09/948,998, entitled "METHOD AND APPARATUS FOR FLEXIBLE STORAGE AND UNIFORM MANIPULATION OF XML DATA IN A RELATIONAL DATABASE SYSTEM," naming as inventors Muralidhar Krishnaprasad et al., filed Sep. 6, 2001, the contents of which are herein incorporated by reference for all purposes as if originally set forth herein, referred to herein as to '998.

FIELD OF THE INVENTION

The present invention relates to query processing. The invention relates more specifically to efficient evaluation of queries using translation.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Relational database management systems (RDBMSs) store information in tables, where each piece of data is stored at a particular row and column. Information in a given row generally is associated with a particular object, and information in a given column generally relates to a particular category of information. For example, each row of a table may correspond to a particular employee, and the various columns of the table may correspond to employee names, employee social security numbers, and employee salaries.

A user retrieves information from and makes updates to a database by interacting with a database application. The user's actions are converted into a query by the database application. The database application submits the query to a database server. The database server responds to the query by accessing the tables specified in the query to determine which information stored in the tables satisfies the query. The information that satisfies the query is retrieved by the database server and transmitted to the database application. Alternatively, a user may request information directly from the database server by constructing and submitting a query directly to the database server using a command line or graphical interface.

Queries submitted to the database server must conform to the syntactical rules of a particular query language. One popular query language, known as the Structured Query Language (SQL), provides users a variety of ways to specify information to be retrieved. Another query language based on the Extensible Markup Language (XML) is XML Query Language (XQuery). XML Query language may have multiple syntactic representations. For instance, one of them is a human-readable version and another is an XML representation (XQueryX). XQuery is described in "XQuery 1.0: An XML Query Language." W3C Working Draft Jul. 23, 2004 at www.w3.org/TR/xquery. XQueryX is described in "XML Syntax for XQuery 1.0 (XQueryX)." W3C Working Draft 19 Dec. 2003 at www.w3.org/TR/xqueryx. Another related technology, XPath, is described in "XML Path Language (XPath) 2.0." W3C Working Draft 12 Nov. 2003 at www.w3.org/TR/xpath20. XQuery and XQueryX may use XPath for path traversal.

To implement XQuery support in RDBMSs, one approach, referred as coprocessor approach, is to embed a general purpose XQuery processor inside an RDBMS engine and have the XQuery processor execute XQuery on behalf of the RDBMS SQL processor. The coprocessor approach has the SQL processor treat the XQuery coprocessor as a black box. During the execution of the SQL statement, the SQL processor handles the XQuery portion of the query by passing the text of the XQuery portion of the query, and the necessary XML values, as input to the XQuery processor. The XQuery processor then returns the results of processing the XQuery portion of the query to the SQL processor and the SQL processor performs any other appropriate operations specified by the query.

The coprocessor approach has numerous problems. First, the XQuery processor is not aware of any of the underlying techniques for storing XML data. Therefore, the XQuery processor needs fully materialized XML as input. Consequently, the XML input needed by the XQuery processor must be constructed or materialized by the RDBMS. Often the XML input needed for the XQuery is stored in the database and may be "shredded" into one or component XML elements, and those XML elements may be stored in one or more relational or object relational tables. Under these conditions, the process of materializing the XML data is time and resource consuming, and therefore makes the coprocessor approach inefficient.

A second problem with the coprocessor approach is that the XQuery portion of an incoming query cannot be optimized with the SQL portion of the incoming query (and vice-versa). Specifically, the XQuery processor is not able to optimize the SQL portion of the query; and the SQL processor is not able to optimize the XQuery portion of the query. Therefore, the SQL and XQuery parts of the query are separately optimized (if at all), which is suboptimal. In addition, the underlying storage of the data needed in the XQuery portion of the query will be stored in a form other than XML (such as being shredded into multiple XMLType columns). Since the XQuery processor is not aware of the form in which the underlying data is stored, the XQuery processor is not able to optimize execution of the XQuery operations based on storage information.

A third problem with the coprocessor approach occurs when an XQuery processor is invoked multiple times, where the output of a first XQuery becomes the input to a second XQuery in the original query. For example, in the case where the output of a first XQuery must be passed as input to a second XQuery, the output of the first XQuery must be generated as XML. This dictates that the XQuery processor, after determining the result of the first XQuery, must materialize the result as XML in an XML document and send the XML document to the SQL processor. The SQL processor then passes the XML document back to the XQuery processor along with the second XQuery. The XQuery processor will then retrieve and process the second XQuery with the XML document. This constitutes numerous wasted communication and computational steps and wasted bandwidth.

Therefore, there is clearly a need for techniques that overcome the shortfalls of the co-processor approach described above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
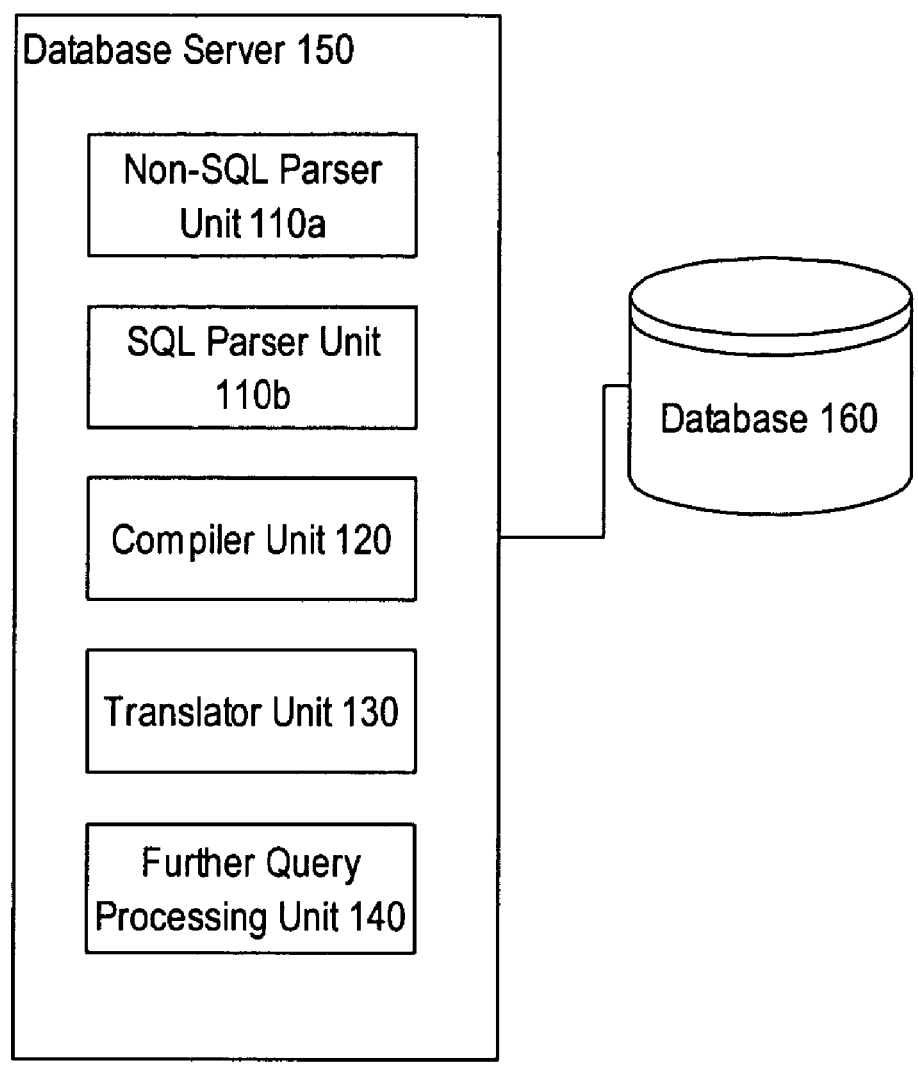
FIG. 1 is a block diagram that depicts a system for efficient evaluation of queries using translation.

Techniques for efficient evaluation of queries using translation are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 Introduction

The techniques described herein are in no way limited to any particular embodiment or aspect of the embodiment. One example embodiment of the techniques described herein is a database server that accepts queries in SQL, XQuery, and XQueryX. This embodiment is described for illustrative purposes only.

When the database server receives a query, it determines whether any portion of the query is in a query language other than SQL (e.g. XQuery or XQueryX). For each such portion, the database server parses the portion and compiles the portion into an abstract syntax tree (AST) in an abstract syntax related to the non-SQL query language. Such ASTs are referred to herein as "non-SQL ASTs" or as AST related to particular query languages, such as XQuery ASTs. The non-SQL AST is then converted into an AST in an abstract syntax related to SQL. Such ASTs are referred to herein as "SQL ASTs." This is repeated for each portion of the query that is in a non-SQL query language (e.g. XQuery or XQueryX). Each portion of the query in the SQL is also compiled into an SQL AST. The database server then combines all of the ASTs corresponding to each portion of the query. This combined AST can then be optimized and executed or stored for later execution.

The techniques described herein apply, at least, to queries that have one or more portions of the query in one or more declarative query languages. Declarative query languages allow one to specify information to be retrieved from a data source without needing to specify how the information is to be retrieved.

2.0 XML Database Operations

Some RDBMSs and object-relational database systems (ORDBMS) support "XML" or "XMLType" as a native datatype. Using XMLType, users can store XML documents in databases via the use of XML tables or XMLType columns of tables. Furthermore, users can convert their relational data into XMLType views via the use of SQL/XML publishing functions, such as XMLElement, XMLConcat, etc. XQuery can be used in SQL through a function such as XMLQuery, which enables queries on XMLType values. The XMLTable function enables one to convert XML values (possibly from one or more XMLType columns, or values returned from an XQuery) into a virtual relational table. Consider an example where a table called "purchaseOrder" is an XMLType table with each row storing a purchaseOrder XML document instance. Each XML document instance has contents similar to the following:

```
<PurchaseOrder>
    <ShippingAddress>345, 35 Ave, Berkeley,
    CA 94613<ShippingAddress>
        <items>
            <lineitem><name>XQuery Book</name><price>46
            </price></lineitem>
            <lineitem><name>SQL/XML Guide</name><price>78
            </price><lineitem>
        </items>
</PurchaseOrder>
```

The following SQL statement, with XQuery embedded in the XMLQuery function, finds the ShippingAddress of all the purchaseOrder XML document instances which have a purchase item whose price is greater than forty-five:

select xmlquery('for $i in/PurchaseOrder where $i/items/
        lineitem/price>45 return $i/ShippingAddress' passing
        value(p) returning content) from purcharserOrder p;

Here is an example of converting the XML document instance into relational tables via XMLTable construct:

```
select xt.name, xt.price
from purchaseOrder p, xmltable('/PurchaseOrder/items/lineitem' passing
value(p)
            columns
                name varchar2(20) path 'name',
                price number path 'price') xt;
```

3.0 System Overview

FIG. 1 is a block diagram that depicts a system for efficient evaluation of queries using translation.

The system illustrated in FIG. 1 includes a database server 150. The database server 150 is a logical machine. The database server 150 includes a non-SQL parser unit 110a, an SQL parser unit 110b, a compiler unit 120, a translator unit 130, and a further query processing unit 140. Each of the units 110a, 110b, 120, 130, and 140 may be a logical machine. Each logical machine may run on separate physical computing machines or may be running on the same physical computing machine as one or more of the other logical machines. Various embodiments of computers and other physical and logical machines are described in detail below in the section entitled Hardware Overview. In one embodiment, each of the units 110-140 are software units running on one or more processors on one or more computers, and those one or more processors on one or more computers make up the database server 150. The database server 150 may include other software units not described herein. The units 110-140 may all be part of the same software program or may be part of separate software programs. That is, a single software program may perform the functionality of two or more of the units 110-140. Alternatively, a first software program may perform some of the functions for a particular unit 110-140 and a second software program may perform other functions for the particular unit 110-140.

The non-SQL parser unit 110a takes a non-SQL query, or portion of a query, as input and converts it to a second representation (such as SQL). For example, the non-SQL parser unit 110a may be an XQuery parser unit 110a that takes as input an XQuery query and converts it into an XQueryX representation. The compiler unit 120 takes a query as input and produces an in-memory representation of the query. For example, the compiler unit 120 may take as input an XQueryX query and compile that into an XQuery AST. In one embodiment, the compiler unit may take as input queries in more than one query language, and queries of each query language are compiled into different formats of in-memory representation. For example, an SQL query may be compiled into an SQL AST, whereas an XQueryX query may be compiled into an XQuery AST. Alternatively, queries in one or more different query languages may be compiled into similar or the same format of in-memory representation. In alternative embodiments, there are separate parser units 110a and 110b and compiler unit 120 for each query language. For example, there may be an XQuery parser unit 110a and an SQL parser unit 110b.

The translator unit 130 converts among the various formats of in-memory representations. For example, the translator unit 130 may convert an XQuery AST into an equivalent SQL AST, or vice-versa.

The further query processing unit 140 takes an in-memory representation as input and provides query optimization, storage, and/or execution of the query based on the in-memory representation of the query. The further query processing unit 140 may also perform the step of combining one or more in-memory representations of queries or parts of a query and performing query optimization, storage, and/or execution of the query or queries based on the combined in-memory representations.

The database server 150 is communicatively coupled to a database 160. The database 160 may be a relational database, an object-oriented database, a file, a repository, or any form of structured data stored on a machine-readable medium. The database server 150 may perform (e.g. using the further query processing unit 140) certain operations required by the query against the database 160 based on the in-memory representations produced by the compiler unit 120, translator unit 130, or further query processing unit 140. In various embodiments, coupling is accomplished by optical, infrared, or radio signal transmission, direct cabling, wireless networking, local area networks (LANs), wide area networks (WANs), wireless local area networks (WLANs), the Internet, or any appropriate communication mechanism.

4.0 Functional Overview

Figure 2:
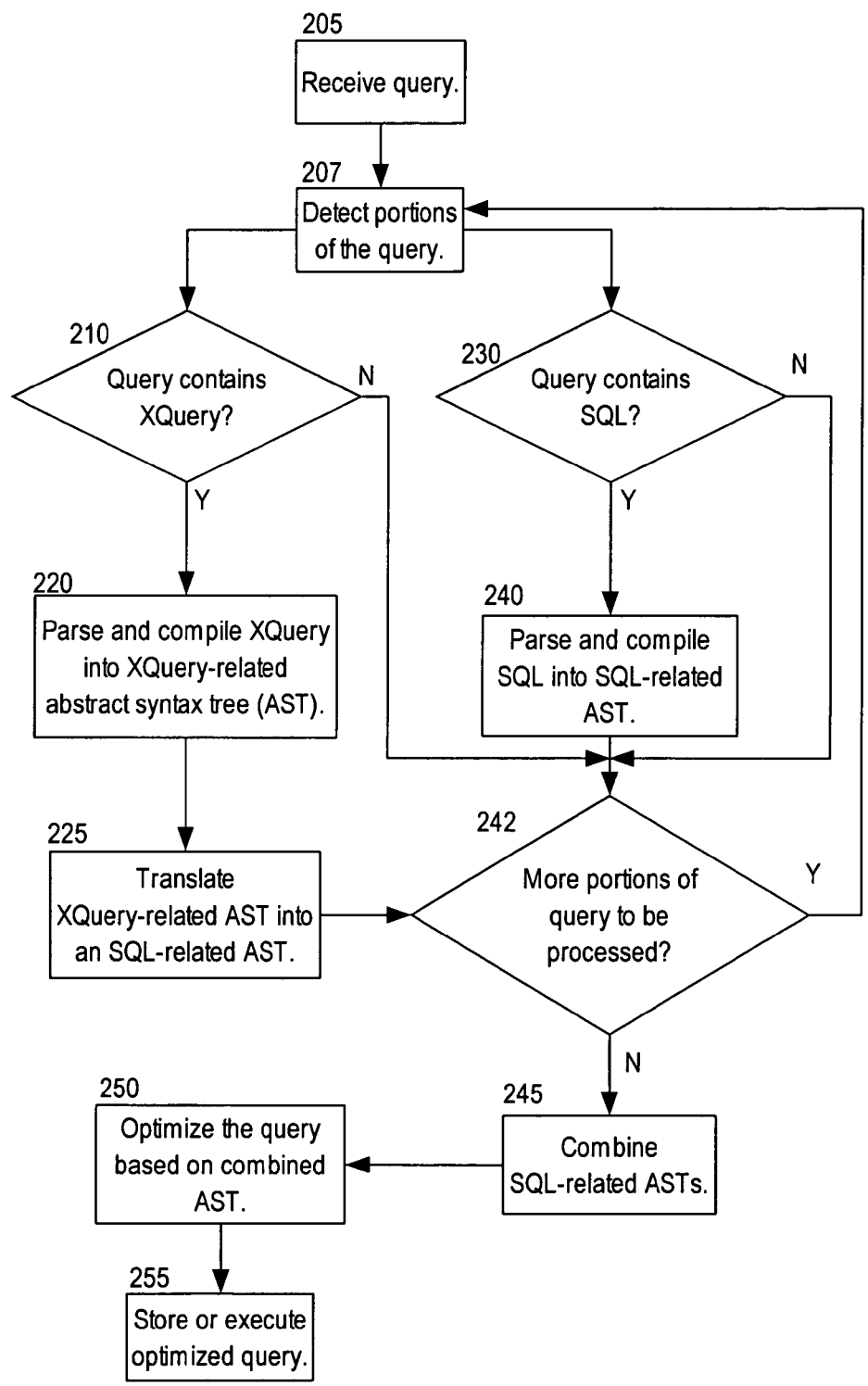
FIG. 2 is a flow diagram that depicts a process for efficient evaluation of queries using translation.

FIG. 2 is a flow diagram that depicts a process for efficient evaluation of queries using translation.

In step 205, a query is received. The query may be in any appropriate format. For example, the query may be in SQL, XQuery, or XQueryX. The query may also utilize a language for addressing parts of a markup language document, such as XPath. The query may contain one or more "portions". Each of the portions may be in the different formats than each of the other portions. For example, in the context of FIG. 1, the database server 150 may receive a query that contains both SQL and XQuery portions:

```
select xmlquery('for $i in /PurchaseOrder where
    $i/items/lineitem/price > 45 return
    $i/ShippingAddress' passing value(p) returning content)
    from purcharserOrder p;
``` where the outer portion of the query is in SQL and the portion of the query inside the xmlquery( . . . ) is in XQuery. The query may also be in a single format.

In step 207, the query is processed in order to detect whether there are portions of the query in one or more query languages. Once the portions of the query are detected in step 207, then checks are performed to determine whether the query contains XQuery (step 210) or SQL (step 230). In other embodiments, other checks would be performed to determine whether the query contained statements in other particular query languages (e.g. XQueryX) and steps similar to those for XQuery (steps 210-225) or SQL (steps 230-245) would be performed for queries in each of those other query languages.

In step 210, a check is performed to determine whether the query contains XQuery. Detecting that a query contains operations to be performed in XQuery may include searching for and finding an XQuery indicator or function call. For example, the non-SQL parser unit 110*a* may parse the query and detect an XMLQuery function and thereby determine that the query contained within the parentheses is in XQuery format. In various embodiments, step 210 also includes determining whether the query contains XQueryX or XPath and the subsequent steps 220-225 are performed on any XQueryX or XPath queries or subqueries that are found.

If the query contains no XQuery, then step 242 is performed. Step 242 is described below. Alternatively, if the query does not contain XQuery or SQL statements and, moreover, contains only elements that are not recognizable by the database server 150, then a message may be sent to the query submitter or a system administrator indicating that the format of the query is not recognizable.

If the query does contain XQuery, then the XQuery portion of the query is parsed and compiled into an XQuery AST in step 220. The XQuery portion of the query may be parsed using any appropriate parser. The parsed XQuery is then compiled into an in-memory representation of the XQuery. The in-memory representation of the XQuery portion of the query is formatted in a way that is compatible with the later steps. The techniques described herein are not limited to any particular in-memory representation. The examples herein will use an abstract syntax tree. ASTs capture the semantic meanings of queries while removing syntactic details.

The AST for the portion of the query in XQuery will be in a particular abstract syntax related to XQuery. In step 225, the XQuery AST for the XQuery portion of the query is converted into an equivalent SQL AST in a particular abstract syntax related to SQL. Each term in the AST is converted in turn. In one embodiment, the elements at the "leaves" or deepest level of the AST are converted from the XQuery-related abstract syntax to the SQL-related abstract syntax. Then the nodes on the next lowest level are converted. The "higher" levels of the AST are processed one level at a time and from the bottom up. Alternatively, one or more of the leaves of the AST are converted and the parent nodes of these leaves are converted once all of their child nodes in the AST are converted. Details of what XQuery statements are converted to which SQL statements are given in the section entitled XQuery Translation and in '706. Once the XQuery AST has been converted into an equivalent SQL AST, then the equivalent SQL AST may later be combined with any other SQL ASTs in step 245 (described below).

After step 225 is performed, then, in step 242, a check is performed to determine whether any other portions of the query need to be processed. If there are more portions of the query to process, then step 207 is performed. Alternatively, if there are more portions of the query to process, steps 210 or 230 may be performed. If there are no more portions of the query to process, then step 245 is performed. In general, any portion of the original query that is in a language supported by the database server 150 may be processed. For example, if a query has a first XQuery portion, a second XQuery portion, and an SQL portion, then steps 210-225 are be performed for each of the first XQuery portion and the second XQuery portions and steps 230-240 are performed for the SQL portion of the query. The compiled portions of the query are then combined (described below with respect to steps 245-255).

In step 230, a check is performed to determine whether the query contains SQL. For example, the SQL parser unit 110*b* may parse the query (in step 207) and detect an SQL portion of the query and thereby determine that the query contains SQL (in step 230). If the query does not contain SQL, then step 242 is performed. Step 242 is described above. If the query does contain SQL, then in step 240, the SQL portions of the query are parsed and compiled into an SQL AST. Various embodiments of parsing and compiling queries in XQuery are given above in relation to step 220. Techniques for parsing and compiling queries in SQL (or any query language) are similar to those described for XQuery but may use an SQL parser and SQL syntax rules for the parsing. The resulting in-memory representation, such as an SQL AST, contains the semantics of the SQL portion of the query in an abstract syntax related to SQL.

After step 240 is performed, then, in step 242, a check is performed to determine whether any other portions of the query need to be processed. Once any XQuery portions of the query have been parsed, compiled, and converted to an SQL AST and any SQL portions of the query have been parsed and compiled into an SQL AST, then the ASTs representing the different portions of the query may be combined in step 245. Combining the ASTs may comprise forming a new AST for the query and pointing to or copying the ASTs representing the different portions of the query. Alternatively, one or more of the ASTs representing the different portions of the query may point to or incorporate one or more of the other ASTs representing the different portions of the query. The combined AST is in an SQL-related abstract syntax and represents the entire query. For example, in the context of FIG. 1, the further query processing unit 140 combines the ASTs produced in steps 225 and 240.

In step 250, the combined AST is used as a basis for optimization of the query. Since the entire query is represented in a single abstract syntax, any appropriate single-abstract-syntax optimization technique may be used to optimize the query. In step 255 the optimized query is executed or stored for later execution.

Various embodiments of the techniques described herein enable a query that contains subqueries in multiple query languages to be stored or executed based on an AST in a single abstract syntax. One of the benefits of embodiments of these techniques is that, since the AST that represents the query is in a single abstract syntax, the entire query may be optimized as if it were originally written in a single query language.

Various embodiments of the techniques described herein enable a query to arrive in a first query language (e.g. XQuery) and for the query to be processed and translated into an equivalent form of a second query language (e.g. SQL). This may be beneficial when the processing or optimization techniques available for the second query language are in some way preferable to those of the first query language. For example, consider a system that does not have XQuery optimizers, but does have SQL query optimizers. Using the techniques described herein, if a query arrives in the XQuery format, the query may be processed and an SQL AST may be generated. The SQL AST may then be optimized using SQL query optimizers. The optimized, equivalent query (as represented by the optimized, SQL AST) may then be executed in place of the original XQuery, thereby saving query processing time.

In the examples discussed herein, the database server 150 receives the non-SQL query or portions of a query and converts them to SQL. The techniques described herein, however, are not limited to such embodiments. For example, in other embodiments, a middle-tier server that acts as middleware between a database application and a database server 150 may perform the conversions as described herein. The converted SQL query would then be sent to and executed on the database server 150.

The techniques described herein are presented in terms of a conversion from one abstract syntax to another. In other embodiments of the techniques described herein, the portion of a query in a first syntax (e.g. XQuery) may be converted to a second syntax (e.g. SQL), before it is compiled into an abstract syntax.

5.0 XQuery Translation

As noted above, the techniques described herein provide for converting an AST in one abstract syntax into an AST of another abstract syntax. Below is a description of the conversion between XQuery ASTs and SQL ASTs.

5.1. Translation of Expressions

XQuery expressions are rewritten to their equivalent SQL expressions. For instance a literal in XQuery gets mapped to a string or numeric literal (OPNTSTR) in SQL. The following table lists the mapping of general expressions in to their SQL equivalents. Section 5.2 describes the mapping of individual XQuery operators and functions to SQL operators.

5.1.1. Effective Boolean Value

The effective Boolean value (EFB) of a sequence is computed implicitly during processing of the following types of expressions:

Logical expressions (and, or)
The ff:not function
The WHERE clause of a FLWOR expression
Certain types of predicates, such as a[b]
Conditional expressions (if)
Quantified expressions (some, every)

The effective Boolean value returns "false" in the following cases. Otherwise it returns "true".

An empty sequence
The Boolean value false
A zero-length value of type xs:string or xdt:untypedAtomic
A numeric value that is equal to zero
The xs:double or xs:float value NaN Example rule: To map EFB(expr) to SQL, the following rules are applied:

i) Translate expr to its SQL equivalent.
ii) If the static type of expr indicates that the quantifier is 1 (i.e. singleton expr) then
   i. If the type is Boolean and the SQL type is also Boolean (i.e. it is mapped to one of the logical operators), then nothing to do
   ii. If the type is Boolean and SQL type is number, then add IS NOT NULL (case <expr> when 1 then 1 else null)
   iii. If the type is numeric then add IS NOT NULL (case <expr> when 0 then 0 when NaN then 0 else 1)
   iv. If the type is any other scalar, then add IS NOT NULL(expr)
iii) If the static type of expr indicates that the quantifier is * or + then
   i. If the type is number or Boolean—convert the collection to a subquery and add the following subquery expression on top—EXISTS(select * from (select count(*)cnt, sum(value(p))sm from table(xmlsequence(<expr>))x where (x.cnt=1 and x.sm=1) or (x.cnt>1))

ii. For all other types map it to IS NOT NULL (<expr>) in case the <expr> is a non-subquery operand or to EXISTS(<expr>) if expr is an SQL subquery.

5.1.2. Atomization of Values

Atomization and conversion to scalar values are required in a number of places. Atomization is determined by the static type analysis. In XQuery this is represented using the fn:data( ) function.

The result of fn:data( ) is the sequence of atomic values produced by applying the following rules to each item in the input sequence:

If the item is an atomic value, it is returned.
If the item is a node, its typed value is returned.

Atomization is used in processing the following types of expressions:

Arithmetic expressions
Comparison expressions
Function calls and returns
Cast expressions
Computed element and attribute constructors.

When rewriting atomization, if the underlying SQL object is an XMLType (or node) an OPTXT2SQLT operator is used to convert the node value to the equivalent SQL type.

Example rule: Whenever atomization is required and the underlying SQL object's type is not scalar, add the OPTXT2SQLT operator with the desired type. OPTXT2SQLT takes the input XML and the SQL type to convert the result to and atomizes the value to the result.

5.1.3. Literal Expressions

Literal Expressions in XQuery are translated to SQL literals. Boolean are mapped as numbers 0 & 1. For example, the expression "1" is mapped to STRTCONS with value "1". Numeric literals are mapped to SQL literals of type NUMBER and string literals are mapped to SQL literals with type VARCHAR2.

Example rule: Map XQuery literals to SQL literals with the appropriate type information. In case of a string literal, if it is >4K, then map to a set of concat operations with an empty_clob in the beginning.

---

Big_String_Literal -> empty_clob( ) || 4kliteral1 || 4kliteral2 . . . || literaln
OPTTCA(OPTTCA(OPTTCA(OPTECLOB, literal1), literal2), . . . literaln)

---

5.1.4. Built-in Type Constructor, Cast Expressions

The XQuery CAST and type constructors are mapped to SQL TO_CHAR, TO_NUMBER and XMLCast. XMLCast is used for casting explicitly to user-defined simple types (e.g. hatsize) and for converting simple scalar types to XML values (for passing into functions etc.).

The following table explains the mapping of XML datatypes to their SQL equivalents. The constructor column is used to check the validity of the value (e.g. byte may be <127 and greater than −128). The constructor may not be needed if the static type indicates that the expression is of the right type (or a subtype). Constant folding may be performed to eliminate the constructor.

Example rule: Check datatype to which to cast. If the input is a constant, then check the bounds and raise an error if appropriate. Else if it is a numeric datatype add the TO_NUMBER and the bounds check. If it is a date type, convert it to the TIMESTAMP_TZ with the appropriate format.

| XML Datatype | SQL Data Type | Example SQL conversion |
| --- | --- | --- |
| xs:integer | NUMBER | TO_NUMBER(<expr>) |
| xs:positiveInteger | NUMBER | OPTXMLCNV(TO_NUMBER(<expr>), QMTXT_POSITIVEINTEGER) |
| xs:negativeInteger | NUMBER | OPTXMLCNV(TO_NUMBER(<expr>), QMTXT_NEGATIVEINTEGER) |
| xs:nonPositiveInteger | NUMBER | OPTXMLCNV(TO_NUMBER(<expr>), QMTXT_NONPOSITIVEINTEGER) |
| xs:nonNegativeInteger | NUMBER | OPTXMLCNV(TO_NUMBER(<expr>), QMTXT_NONNEGATIVEINTEGER) |
| xs:int | NUMBER | OPTXMLCNV(TO_NUMBER(<expr>), QMTXT_INT) |
| xs:short | NUMBER | OPTXMLCNV(TO_NUMBER(<expr>), QMTXT_SHORT) |
| xs:double | BINARY_DOUBLE | TO_BINARY_DOUBLE(<expr>) |
| xs:float | BINARY_FLOAT | TO_BINARY_FLOAR(<expr>) |
| xs:byte | NUMBER | OPTXMLCNV(TO_NUMBER(<expr>), QMTXT_BYTE) |
| xs:string | VARCHAR2/ CLOB | TO_CHAR(<expr>) |
| xs:unsignedByte | NUMBER | OPTXMLCNV(TO_NUMBER((<expr>), QMTXT_UNSIGNEDBYTE) |
| xs:unsignedShort | NUMBER | OPTXMLCNV(TO_NUMBER(<expr>), QMTXT_UNSIGNEDSHORT) |
| xs:unsignedInt | NUMBER | OPTXMLCNV(TO_NUMBER(<expr>), QMTXT_UNSIGNEDINT) |
| xs:long | NUMBER | OPTXMLCNV(TO_NUMBER(<expr>), QMTXT_LONG) |
| xs:unsignedLong | NUMBER | OPTXMLCNV(TO_NUMBER(<expr>), QMTXT_UNSIGNEDLONG) |
| xs:decimal | NUMBER | TO_NUMBER(<expr>) |
| xs:Boolean | NUMBER | Case <expr> when null then 0 when 0 then 0 when NaN then 0 else 1 |
| xs:base64Binary | RAW/BLOB | OPTXMLCNV(<expr>, QMTXT_BASE64BINARY) |
| xs:hexBinary | RAW/BLOB | OPTXMLCNV(<expr>, QMTXT_HEXBINARY) |
| xs:dateTime | TIMESTAMP_TZ | OPTXMLCNV(<expr>, QMTXT_DATETIMETZ) |
| xs:time | TIMESTAMIP_TZ | OPTXMLCNV(<expr>, QMTXT_TIMETZ) |
| xs:date | TIMESTAMP_TZ | OPTXMLCNV(<expr>, QMTXT_DATETZ) |
| xs:gday | TIMESTAMP_TZ | OPTXMLCNV(<expr>, QMTXT_GDAYTZ) |
| xs:gMonth | TIMESTAMP_TZ | OPTXMLCNV(<expr>, QMTXT_GMONTHTZ) |
| xs:GYearMonth | TIMESTAMP_TZ | OPTXMLCNV(<expr>, QMTXT_GYEARMONTHTZ) |
| xs:GMonthDay | TIMESTAMP_TZ | OPTXMLCNV(<expr>, QMTXT_GMONTHDAYTZ) |
| xs:gYear | TIMESTAMP_TZ | OPTXMLCNV(<expr>, QMTXT_GYEARTZ) |

5.1.5. Sequence Constructors

XMLConcat( ) is used for concatenating sequences. However, XML constructors are needed for converting scalar values to XMLType. For example, the sequence constructor (1, 2, 3) is mapped to XMLConcat(XMLCast(1), XMLCast(2), XMLCast(3)).

Example rule: Iterate over all the input of the sequence constructor. For each expression, convert it into its SQL equivalent. If the result type is a simple scalar, add an XMLCast operand on top of it. Create an XMLConcat( ) to concatenate the result into a single XMLType.

5.1.6. Range Expression

Range expressions may be handled by using an operator OPTXNRNG( ). See the range operator in operator listing. This range operator returns an XMLType containing a list of integers.

Example rule: Map to the OPTXNRNG operator.

5.1.7. Set Expressions (UNION, INTERSECT, MINUS, EXCEPT)

Set operations are transformed to value operation in case of unions on values. If XMLType(Seq) may be mappable to SQL UNION, INTERSECT, MINUS, and/or EXCEPT constructs, and doing so may eliminate duplicates among nodes.

Example rule: Map the set expressions to the SQL UNION, INTERSECT, MINUS, and EXCEPT constructs. The order/map method is used on the XMLType to perform node level operations.

5.1.8. Arithmetic Expressions

Static typing ensures that input may be numerical values or atomization and type casts are added. The translation simply converts it to the SQL arithmetic expression.

Example rule: Convert the XQuery arithmetic expression to its SQL equivalent. See operators table for detailed mapping of the various operators.

5.1.9. Value Comparison Expressions

Static typing ensures that input may be scalar values or atomization and type casts are added. The translation simply converts it to the SQL comparison expression.

Example rule: Convert the XQuery comparison expression to its SQL equivalent. See operators table for detailed mapping of the various operators.

5.1.10. General Comparison Expressions

Static typechecking may convert any general comparison expression to a value comparison if possible. If both sides are non collection values and the types are compatible they are converted to value comparison. For example, the expression, $po/PoNo=21 may be converted to $po/PoNo eq 21 if the type quantifier of $po/PoNo is not a collection (*, + etc.).

If the static type information for both the sides are known compatible scalar types (e.g. integer *) they are mapped to EXISTS subqueries. For example, $po//LineItems=21 may get mapped to EXISTS(select * from TABLE(XMLSE-QUENCE(<xpath-conv-for $po//LineItems>))x where value(x)=21).

If the static type is unknown (untypedAtomic *) then the equivalent general comparison operator is used.

Example rule: Given expr1 GCOMP expr2, check the compatibility of the static types of the two expressions.

If the type of both sides is untypedAtomic, they are both converted to a VARCHAR2 type.

If one side is untypedAtomic and the other is a numeric value, then the untypedAtomic value is converted to the BINARY_DOUBLE.

Now check the quantifier for the type (e.g. quantifier (integer *) is *). For example:

If the quantifier for both sides is a singleton (empty or ?) then map the GCOMP to the SQL value comparison operator.

If expr1 quantifier type is a collection (* or +) and expr2 quantifier is a singleton then map to
  EXISTS(select null from TABLE(XMLSEQUENCE (expr1)x
    Where value(x) VCOMP expr2) (VCOMP is the value comparison equivalent)
  e.g. $po//LineItemNo<20 becomes (assuming the static type of $po//LineItemNo is integer*)
    EXISTS(select null from TABLE(XMLSEQUENCE ($po//LineItemNo)x
      Where value(x)<20)

If expr2 quantifier type is a collection (* or +) and expr1 quantifier is a singleton then map to
  EXISTS(select null from TABLE(XMLSEQUENCE (expr2)x
    Where expr1 VCOMP value(x)) (VCOMP is the value comparison equivalent)
  e.g. 20<$po//LineItemNo becomes (assuming the static type of $po//LineItemNo is integer*)
    EXISTS(select null from TABLE(XMLSEQUENCE ($po//LineItemNo)x
      Where 20<value(x))

If both expressions are collections then map the expression to
  EXISTS(select null from TABLE(XMLSEQUENCE (expr1)x
    Where EXISTS (select null from TABLE(XMLSE-QUENCE(expr2)y
      Where value(x) VCOMP value(y)))
  e.g. $po1//LineItemNo<$po2//LineItemNo becomes
    EXISTS(select null from TABLE(XMLSEQUENCE ($po1//LineItemNo)x
      Where EXISTS (select null from TABLE(XMLSE-QUENCE($po2//LineItemNo)y
        Where value(x)<value(y)))

5.1.11. Node Comparison Expressions

Node comparisons are handled by using the order method on XMLType. They are mapped to the SQL value comparison operators.

Example rule: Map to the SQL value comparison operators as described herein.

5.1.12. Order Comparison Expressions

Order comparison expressions are used in the FLWOR order by clause. These are mapped to the SQL order by clause.

Example rule: Map Order comparison expressions to SQL order by clause expressions.

5.1.13. Logical Expressions (AND, OR, NOT)

XML logical expressions are mapped to SQL logical expressions. SQL has 3-valued logic, but empty sequences are mapped to NULL and this works for non-constraint operations. Constraints may be an important issue, since a NULL value from a constraint is treated as matching the constraint.

Example rule: Map logical expressions to SQL logical expressions (AND, OR). In case when the logical expression appears as a top-level expression (outside of the WHERE clause or IF clause) then add a CASE Expression to the result. E.g. if the query is the expressions "a<20 and b>30", map it to CASE WHEN (a<20 and b>30) then 1 else 0.

5.1.14. FLWOR Expression

FLWOR expressions are mapped to SQL select expressions. The LET clauses are mapped as common sub expressions in the SQL query. The RHS of the for-clause is mapped to the from-clause, the where-clause is mapped to the SQL where-clause and the return-clause is mapped to the SQL select-clause. If node identities are to be preserved in the query, then the query block is marked as NO_MERGE.

```
for <var> in <rhs-expr1>,
    <var2> in <rhs-expr2>
where <cond-expression>
order by <o1>, <o2>... <on>
return <ret-expr>
is mapped to
  select /*+ NO_MERGE */ XMLAGG( <sql-ret-expr> )
  from TABLE(XMLSEQUENCE( <sql-rhs-expr1> ) as "var1"
       TABLE(XMLSEQUENCE( <sql-rhs-expr2> ) as "var2"
  where <sql-cond>
  order by <sql-o1>, <sql-o2>,... <sql-on>
```

EXAMPLE 1

Simple FLWOR Clause

```
for $i in (1,2,3)
where $i > 1
return $i+ 2
is mapped to
  select xmlagg(XMLCast(XMLCast(value("$i") as number) + 1 as xml))
  from table(xmlsequence( xmlconcat ( cast (1 as xmltype(sequence)),
                                      cast (2 as xmltype(sequence)),
                                      cast (3 as xmltype(sequence))))
                                         returning sequence) as "$i"
  where XMLCast(value("$i") as number) > 1;
```

EXAMPLE 2

FLWOR Clause with XPath Expressions

```
for $i in doc("foo.xml")/PurchaseOrder
    where $i/PoNo = 21
    return <A>{$i}</A>
becomes
    select xmlagg(XMLElement("A", value("$i")))
    from table(xmlsequence( extract ( select
    extract(Res,'/Contents/*') from resource_view
    where equals_path(res,'/foo.xml') = 1),
                    '/PurchaseOrder'))) "$i"
    where XMLCast( OPTXATG(value("$i"), '/PoNo') as number) = 21
```

5.1.14.1. Let Clause Handling

A LET clause expression is inlined into the query expression (and marked as common subexpression) if node identities need not be preserved. Otherwise a subquery is created with the LET clause expressions as it's select list. The subquery is marked as non-mergeable to prevent view merging.

Example with node identities preserved:

```
for $i in doc("foo.xml")/PurchaseOrder//LineItems
    let $j := doc("baditems.xml")//BadItems
        where $i/ItemNo eq $j/ItemNo
        return ($i, $j/BadItem)
becomes
    select xmlagg(xmlconcat("$i", OPTXATG("$j",'/BadItem')))
    from
        (select /*+ NO_MERGE */ value("$I") as "$I",
            (select XMLAgg(OPTXATG(value(x))
            from table(xmlsequence(
                extract ( select extract(Res,'/Contents/*')
                    from resource_view
                    where equals_path(res,'/baditems.xml') = 1),
                        '//BadItems'))) "x"
        ) as "$j"
        from table(xmlsequence( OPTXATG(
    OPTXATG ( select extract(Res,'/Contents/*')
        from resource_view
        where equals_path(res,'/foo.xml') = 1),
                '/PurchaseOrder'),
    '//LineItems'))) "$i"
    )
    where exists( select null from table(xmlsequence(
    OPTXATG("$j",'/ItemNo'))) x
        where XMLCast(OPTXATG("$I",'/ItemNo')as number) =
    XMLCast(x as number));
```

Example without preservation of node identities: If node identity preservation is not critical, then the LET clause may be inlined into the expression itself directly. This optimization may be done either by requiring the user to have a pragma specifying that node identities are not essential. This may be also be done implicitly be examining the globally to determine whether any node related operations are used in the query.

```
for $i in doc("foo.xml")/PurchaseOrder//LineItems
    let $j := doc("baditems.xml")//BadItems
        where $i/ItemNo eq $j/ItemNo
        return $i
becomes
    select xmlagg(value("$i")
    from table(xmlsequence(OPTXATG (
```

```
        OPTXATG (
            select extract(Res,'/Contents/*')
            from resource_view
            where equals_path(res,'/foo.xml') = 1),
                '/PurchaseOrder'),
        '//LineItems))) "$i"
    where exists( select null
        from table(xmlsequence(
            OPTXATG( (select XMLAgg(OPTXATG(value(x))
                from table(xmlsequence(
        extract (select extract(Res,'/Contents/*')
            from resource_view
            where equals_path(res,'/baditems.xml') = 1),
                '//BadItems'))) "$j"
    where XMLCast(OPTXATG("$i",'/ItemNo') as number) =
            XMLCast(OPTXATG("$j",'/ItemNo') as number));
```

Example technique: Since preventing view merging may adversely affect query performance, the WHERE clause for the FLWOR expression is first searched to see if it includes any of the LET variable. If not, then the LET clause may be evaluated as a result of the FLWOR clause (along with the return).

For example in the following query,

```
for $i in doc("foo.xml")/PurchaseOrder//LineItems
    let $j := count(doc("baditems.xml")//BadItems[ItemNo =
$i/ItemNo])
        where $i/ItemNo > 200
        return $j
```

$j is often used in the return clause and not in the WHERE clause—so that the WHERE clause may be evaluated before the LET clause. This query is equivalent to

```
for $j in
    for $i in doc("foo.xml")/PurchaseOrder//LineItems
    where $i/ItemNo > 200
    return
        count(doc("baditems.xml")//BadItems[ItemNo = $i/ItemNo]
        return $j
```

Example rules: Normalize Type declarations: If the FOR or LET clause involves any type declaration, check the static type of the expression corresponding to the clause. If it is the same or a subtype of the declared type then ignore the type declaration. If it is a supertype of the declared type, then add a TREAT expression on the expression and map it to SQL. Otherwise raise an error. For <var><type>:=<expr> is normalized to for <var>:=TREAT<expr> as <type> and then mapped to SQL.

Convert all expressions in the FOR, WHERE, LET and RETURN clauses to their SQL equivalent. Map the FOR clause expressions to SQL FROM clauses (joins). If node identity need not be preserved, then inline the LET clause expression wherever it is referenced. For example:

```
For <var1> in <expr1>, <var2> in <expr2>
    let <var3> in <expr3>
        where <cond-referencing-var3>
        return <expr4>
``` is mapped to

```
select xmlagg(<expr4>) /* inline var3 references with expr3 */
from table(xmlsequence( <expr1> ) as "var1",
     table(xmlsequence( <expr2>) as "var2",...
where <cond-referencing-var3> /* inline var3 references with
expr3 */
```

Otherwise, if node identity is to be preserved, examine the LET clauses in the FLWOR expression to determine if they may be evaluated before the WHERE clause, by checking whether the variables defined in the LET clauses are used in the WHERE clause. Add a NO_MERGE hint on the inner query block to indicate that view merging should not happen.

If the LET clause needs to be evaluated before the WHERE clause, map the LET clause expression as a select list subquery and map the WHERE clause to the SQL WHERE clause of the outer query block. For example:

```
For <var1> in <expr1>, <var2> in <expr2>
     let <var3> in <expr3>
        where <cond-referencing-var3>
        return <expr4>
is mapped to
     select xmlagg( <expr4> )
     from    (select /*+ NO_MERGE */
                  value("var1") as "var1",
                  value("var2") as "var2",...
                  <expr3> as "var3"
               from table(xmlsequence( <expr1> ) as "var1",
                  table(xmlsequence( <expr2>) as "var2",...
             )
     where <cond-referencing-var3>
     )
```

If the LET clause need NOT be evaluated before the WHERE clause, map the LET clause expression as a select list subquery, but map the WHERE clause to the SQL WHERE clause of the inner query block. For example:

```
For <var1> in <expr1>, <var2> in <expr2>
     let <var3> in <expr3>
        where <cond-not-referencing-var3>
        return <expr4-refecencing-var3>
is mapped to
     select xmlagg(<expr4-referencing-var3> )
     from
         (select /*+ NO_MERGE */
              value("var1") as "var1",
              value("var2") as "var2",...
              <expr3> as "var3"
           from table(xmlsequence( <expr1> ) as "var1",
                  table(xmlsequence( <expr2>) as "var2",...
           where <cond-referencing-var3>
           )
```

5.1.15. Path Expressions

Path expressions are mapped to SQL expressions. An operator OPTXATG is used to extract out individual nodes in the path expression. It represents a single step traversal. Static typechecking is used to optimize some of the path expression conversion.

5.1.15.1. Path Steps with Name Test

This represents the standard XPath 1.0 path expressions. Simple path traversals with name tests are rewritten to the OPTXATG operator. Static type checking is used to figure out the type and cardinality of the various steps. This is later used for translation. Predicates are mapped to relational WHERE clauses after normalization. General comparisons involving collection elements are mapped to subqueries involving value comparisons. If there is no static type checking information available, then each step is assumed to produce an untypedAny.

OPTXATGs are further optimized (or collapsed) based on the input arguments. For example:

```
$i/PurchaseOrder/PoNo
is mapped to
    OPTXATG(OPTXATG($i, 'PurchaseOrder'), 'PoNo').
```

OPTXATGs are further optimized (or collapsed) based on the input arguments. For example the expression,

```
(<A><B>33</B></A>)/A/B
is mapped to
    OPTXATG(OPTXATG(XMLElement("A", XMLElement("B", 33)),
    'A'), 'B')
```

The XATG that extracts A and the XMLElement( ) creating A are collapsed and the result is XMLElement("B", 333) which corresponds to the result <B>33</B>.

In a second example, path predicates are mapped to relational predicates:

```
$i/PurchaseOrder/PoNo eq 21
gets mapped to
    XMLCast( OPTXATG( OPTXATG ( $i , 'PurchaseOrder'), 'PoNo')
    as number) = 21
```

The previous mapping is only valid if during static type checking the type of PoNo is an atomic value that may be cast to a number. If there is no schema information available, then the static type information may only yield the fact that PoNo is of xs:anyType. The XMLCast in this case may perform atomization of the values and raise error if the input (PoNo) is not a single atomic value or element castable to a number.

If the general comparison operator (=) was used and the type information is not known, then it has to be treated as a collection comparison. In this case, the path predicate is rewritten to a TABLE subquery using the value comparison. For example:

```
$i/PurchaseOrder/PoNo = 21
gets mapped to
    EXISTS( select null
        from table (xmlsequence(OPTXATG( OPTXATG ( $i ,
        'PurchaseOrder'), 'PoNo')))) x
        where XMLCast( value(x) as number) = 21 )
```

A path expression that involves predicates in the path step itself is also handled in a similar fashion. For example:

```
$i/PurchaseOrder[PoNo eq 21]
gets mapped to
    select OPTXATG( $i, 'PurchaseOrder')
```

-continued

```
from dual
where XMLCast( OPTXATG( OPTXATG ( $i , 'PurchaseOrder'),
  'PoNo') as number) = 21
``` and in the case of general comparison with no schema inputs,

```
$i/PurchaseOrder[PoNo = 21]
gets mapped to
  select XMLAGG(value(v))
  from table(xmlsequence(OPTXATG($I, 'PurchaseOrder')) v
  where exists(
    select null from
    table(xmlsequence(OPTXATG( value($v), 'PoNo'))) x
    where XMLCast(value(x) as number) = 21);
```

5.1.15.2. Path Steps with Kind Test

Kind test involve checking the type of the node (e.g. text( ), processing-instruction( ) etc.). XQuery adds more sets of type check such as the name and schema type of the node. For example, $i/element(foo, bar) indicates that the child element named foo of type bar needs to be extracted. The OPTXATG operator is enhanced to take in a node type in addition to the node name for extraction.

5.1.15.3. Path Steps with Filter Expressions

Filter expressions are handled by normalizing the path expression and pushing the path expression into the context node. For example, $i/PurchaseOrder/(for $j in LineItems return count($j/Orders) may be normalized into (for $j in $i/PurchaseOrder/LineItems return count($j/Orders)).

Example rule: For each step of the path expression map it to an SQL operator as follows:
  a) If the step is a name test, then map it to the OPTXATG operator. <expr> <step> <QName-or-wildcard> maps to OPTXATG(<expr>, <step>, <localname>, <namespace>)
  b) If the step is a kind test, then map it to the OPTXATG operator with type information <expr> <step> <type> is mapped to OPTXATG(<expr>, <step>, <type>)
  c) If the step is a filter step, then normalize the expression as follows—<expr> <step> <filterexpr> is normalized to (for $m in <expr> return <filterexpr> with the context node in the filter expr changed to $m. This is then rewritten to SQL.

For example, $i/PurchaseOrder/(for $j in LineItems return count($j/Orders)) is normalized into for $m in $i/Purchase-Order return (for $j in $m/LineItems return count($j/Orders)) and then mapped to SQL.

For predicates in the path expression, the static type of the expression containing the predicate may be checked as followed:
  a) If the static type indicates that the expression results in a collection (quantifier=* or +), then create a subquery with the expression and map the predicate to the WHERE clause.
  b) Else if the static type indicates that the expression results in a singleton node, map to a

5.1.16. Conditional Expressions

If-then-else expressions are mapped to the SQL CASE WHEN Expressions.

Example rule: Given if <expr1> then <expr2> else <expr3>. Add the effective Boolean value operator to expr1 if necessary (as determined by the static type checking), and map the expression to CASE WHEN <expr1> then <expr2> else <expr3>.

5.1.17. Quantified Expressions

Quantified expressions may be mapped into SQL EXISTS clauses. For example to find all purchaseorders where at least one of the lineitem number is present in the bad items list,

```
for $I in ora:view("po_TAB")//PurchaseOrder
  where some $j in $i//LineItem satisfies
    for $k in ora:view("bad_items") where $k//ItemNo =
    $j/ItemNo return $k,
``` where "ora:view( )" is an XQuery function that returns the data from a relation table in XML form, may be mapped to

```
select value("$I")
from "po_TAB" "$I"
where exists(
    select( select "$k"
        from (select value(p) "$k" from "bad_items" p)
        where OPTXATG("$k", '//ItemNo') =
OPTXATG("$j", '/ItemNo')
    )
    from (
      select value("$j") as "$j"
      from table(xmlsequence(OPTXATG(value("$I"), '//LineItem')))
"$j"
    )
)
```

5.1.18. Direct Element Constructor Expression

Element constructors are mapped to XMLElement( ) operator. Attributes inside the element are mapped to the XMLAttributes( ) clause in the XMLElement( ) operator.
  Example,

```
<A> { "21" } </A> is mapped to XMLelement(NAME "A", '21') and
<A b="21">22</A> is mapped to XMLElement(NAME "A",
XMLAttributes(21 as "b"), '22')
```

Example rule: Map any element constructor to XMLElement( ) using XMLAttributes( ) for attribute construction.

5.1.19. Computed Element Constructor Expression

Computed element constructor is also mapped to XMLElement( ). Any computed attribute constructor that is a child of the element constructor is optimized and mapped to the XMLAttributes( ) clause. The XMLElement( ) operator is relaxed to allow dynamic element names. The operator may also be modified to make free standing attribute children to become the element's attributes.

```
element {"a"} { "21" }
is mapped to
  XMLElement(NAME EXPR 'a', '21')
and
  element {"a"} {
    Attribute b { "21" }
    {22}
  }
is mapped to
  XMLElement(NAME EXPR 'a', XMLAttributes('21' as "a"), '22')
```

Example rule: Map any computed element constructor to XMLElement( ) and map child attribute constructors to XMLAttribute( ).

5.1.20. Computed Attribute Constructor Expression

Attribute constructors are handled by allowing the XMLAttribute( ) as a top level SQL function.

---
Attribute "a" { "21" } </A>
is mapped to
    XMLAttribute(21 as "a")

---

Example rule: Map Attribute constructors to XMLAttribute.

5.1.21. Other XML Construction Expressions

Example rule: The XML constructors are mapped to the equivalent SQL/XML standard functions.

---
| | |
|---|---|
| XMLComment | OPTXMLCOM |
| XMLProcessingInstruction | OPTXMLPI |
| CDataSection | OPTXMLCDATA |
| ComputedElemConstructor | OPTXMLELEM |
| ComputedAttributeConstructor | OPTXMLATTR |
| ComputedDocumentConstructor | OPTXMLROOT |
| ComputedTextConstructor | OPTXMLTXT |

---

5.1.22. Typeswitch Expression

Typeswitch expressions are similar to if-then-else except that they switch on the type of the input. The typechecking may be performed using an SQL operator OPTXTYPCHK that checks the XQuery type of the input returning 1 if the type matches. If the static type information of the expression is known the typeswitch may be optimized away completely. The OPTXTYPCHK operator may be optimized away for most of the cases where the static type check information may optimize the type checking.

Example rule: Map Typeswitch to Case expression and use the OPTXTYPCHK to check the type of the input. Given ---
typeswitch <expr>
    case <var1> as <type1> return <expr1>
    case <var2> as <type2> return <expr2>
    ...
    default <exprn>

---

Check the static type of <expr>. Let this be etype. Now for each Case expression match the etype with the type-i in the Case expression. If the two types are the same or etype is a subtype of type-i, then optimize the typeswtich expression away and return the SQL equivalent of expr-i. If type-i is a subtype of etype then map the entire typeswitch expression to the SQL expression of the form ---
Case when OPTXTYPCHK(<expr>, <type1>) = 1 then <expr1>
    When OPTXTYPCHK(<expr>, <type2>) = 1 then <expr2>
    ...
  else <exprn>

---

If no type-i is in the type hierarchy of etype then return the SQL equivalent of the default expression exprn.

5.1.23. Instance of Expression

InstanceOf expression may be evaluated using the OPTXTYPCHK operator and may be optimized using the static type of the input expression.

Example rule: Given <expr1> instanceOf <type1>. Check if the static type of <expr1> is the same or a subtype of <type1>. If so, then remove the expression. If the static type is a supertype of type1 then map to OPTXTYPCHK (<expr1>, <type1>). Else it is an error.

5.1.24. Castable Expression

Castable expressions are used to check if the input is castable to the given form. They may be mapped to SQL using an OPTCASTABLE operator that may be used to determine if the expression is castable to the other type. Note that this expression may be removed if the static type of the input is the same or a subtype of the input.

Example rule: Map <expr> castable as <type> is mapped to OPTXTYPCHK(<expr>, <type>)

5.1.25. Treat Expression

Treat expressions are mapped to Case expressions.

Example rule: Map treat <expr> as <type> to CASE WHEN OPTXTYPCHK(<expr>, <type>)=1 then <expr> else error( ) end.

5.1.26. Validate Expression

Validate expressions are mapped to the XMLValidate( ) function. The XMLValidate( ) is an SQL operator that takes in a schema type (local or global) and returns the validated XML value back or an error.

Example rule: Map validate <type> <expr> to XML Validate(<expr>, <type>)

Validate expressions may also be mapped to an XMLIsValido function.

5.1.27. Aggregate Expression

XQuery allows aggregates to be present anywhere in the query. This is not directly supported by SQL. For example, the following XQuery returns all purchaseorders that have more than 21 lineitems in them.

---
for $i in doc("Po.xml")
where count($i/PurchaseOrder/LineItems) > 21
return $i

---

Aggregates are rewritten using a subquery to compute the aggregate.

---
select x.res
  from (select res from resource_view where
    equals_path(res, 'Po.xml') = 1) x
  where (
    select count(value(z))
    from table(xmlsequence(OPTXATG(OPTXATG(x.res,
    'PurchaseOrder'), 'LineItems'))) z
    ) > 21;

---

Example rule: When mapping Functions & Operators (F&O) to SQL expressions, if the F&O is an aggregate then map it to an SQL Subquery. Map agg-func (<expr>) to (select sql-agg-func(value(p)) from table(xmlsequence(<expr>))p).

5.1.28. Polymorphic Operator

Since XQuery allows overloading of arithmetic and comparison function to handle a variety of datatypes, the mapping to an SQL operator may vary depending on the run-time input types of the operands. XQuery operators utilizing such overloading are called "polymorphic operators."

For example, consider, the following XQuery expression:
declare $b xs:boolean external;
(if ($b) then 3.3 else xs:date("2001-08-25"))+(if ($b) then 44 else xdt:yearMonthDuration("P5Y0M")

Depending on the value at run time for the external variable $b, the addition in XQuery can be translated to decimal addition (in this case, it adds decimal value 3.3 and 44) or can be translated to date addition with yearMonthDuration (in this case, it adds five years and zero months to the date '2001-08-25' which yields the date '2006-08-25').

Therefore, the determination as to whether this expression is mapped to the SQL decimal operator or SQL date addition operator may only be made at run time. To support this, the techniques described herein map arithmetic expressions, whose input data type is polymorphic as determined from static type check, into polymorphic SQL arithmetic operators. A polymorphic SQL arithmetic operator can dispatch to the appropriate SQL arithmetic operator at run time depending on the run time input types.

Similar translations are used for polymorphic XQuery comparison functions as well. Polymorphic XQuery comparison functions are mapped to polymorphic SQL value comparison operators.

As noted above, it may be beneficial to use polymorphic operator translation if the input types may vary during XQuery compile time. Furthermore, non-polymorphic XQuery expressions, such as 3.3+44, may still be directly translated it into non-polymorphic SQL expressions, e.g. using SQL decimal addition operators, instead of the polymorphic SQL operators.

5.1.29. XQuery User-Defined and External Functions

XQuery supports user-defined functions written in XQuery and external functions whose implementation is outside of the XQuery environment. For example, the body of a function may be written in a programming language such as the Java programming language.

User-defined XQuery functions may be translated into Oracle PL/SQL (Procedural Language/Structured Query Language) functions. This may be performed by translating the body of a user-defined XQuery function from an XQuery expression into a PL/SQL expression. Additionally, an invocation of an XQuery function may be translated into an invocation of a PL/SQL function in SQL.

The techniques described herein also support external user-defined functions in XQuery. For example, if the body of a function is written in the Java programming language, then the function may be mapped to an equivalent external user-defined function using an SQL external user-defined function written in the target language (for example, a Java user-defined SQL function). Therefore, an external user-defined function in XQuery, implemented in Java, C, PL/SQL, or any other appropriate language, may be translated into a user-defined PL/SQL function, written in Java, C, PL/SQL, or any other appropriate language supported by the SQL system.

5.1.30. XQuery Module

XQuery supports modules. XQuery modules are fragments of XQuery code that can be independently created and imported or loaded into an XQuery processor. XQuery modules may be translated into Oracle PL/SQL packages that may be independently created and loaded into the database server.

5.2. Mapping of Functions & Operators

The following table illustrates the mapping of XQuery operators and standard functions (F&O) to existing or new SQL operators.

| XQuery Operator | SQL mapping | Optimized | Notes |
| --- | --- | --- | --- |
| And | OPTAND | | Empty sequence returns empty sequence. NULL on NULL is ok for these cases, since the WHERE clause may not be satisfied. |
| Or | OPTOR | | -same- |
| > | OPTXGT | OPTTGT | Optimization in case when General Comparison may be normalized to value comparison. May be translated to polymorphic SQL operator. May be translated to SQL exists subquery with value comparisons as illustrated in section 5.1.10 General Comparison Expression. |
| < | OPTXLT | OPTTLT | -same- |
| >= | OPTXGE | OPTTGE | -same- |
| <= | OPTXLE | OPTTLE | -same- |
| = | OPTXEQ | OPTTEQ | -same- |
| != | OPTXNE | OPTTNE | -same- |
| | OPTTLT | | Also add ERROR_ON_NULL(LHS) in case the left hand side (LHS) is NULLABLE (e.g. optional element/attribute) $i/b < 20 is mapped to i.b < 20 and error_on_null(i.b) if i.b is mapped to a nullable value. |
| gt | OPTTGT | | Empty sequence returns empty sequence. NULL on NULL is ok for these cases, since the WHERE clause may not be satisfied. May be translated to polymorphic SQL operator. |
| eq | OPTTEQ | | -same- |
| ne | OPTTNE | | -same- |
| le | OPTTLE | | -same- |

-continued

| XQuery Operator | SQL mapping | Optimized | Notes |
|---|---|---|---|
| ge | OPTTGE | | -same- |
| node is | OPTTEQ | | Node operation |
| >> | OPTTGT | | -same-, |
| << | OPTTLT | | |
| range | OPTXNRNG | | Range operator |
| union, \| | OPTXUJ | OPTTUN | If adding map or order method on XMLType(Seq), then may reuse the regular UNION/INTERSECT etc. |
| intersect | OPTXINTR | OPTTIS | -same- |
| except | OPTXEXC | OPTTMI | -same- |
| + | OPTTAD | | Add TO_NUMBER( ) on non-char inputs. May be translated to polymorphic SQL operator. |
| − | OPTTSU | | -same- |
| mult | OPTTMU | | -same- |
| div | OPTTDI | | -same- −INF, +INF are handled by binary_float operators. May cast LHS or RHS to binary_float or binary_double if the XMLSchema datatype is float/double. |
| idiv | OPTTTR, OPTTDI | | truncate(div) returns integer division |
| unary + | — | | Ignored |
| unary − | OPTTNG | | |
| mod | OPTTMO | | or the divisor is positive or negative zero (0), or both, the result is NaN - Return 0 if the divisor is 0. |
| cast functions | | | See Datatype Mapping |
| Node Functions | | | |
| fn:nodename | OPTXNNAME | | XPath operators |
| fn:string | OPTXSTRING | | String conversion |
| fn:data | OPTXT2SQLT | | This is an SQL operator which does atomization. |
| fn:base-uri | OPTXBURI | | |
| fn:document-uri | OPTXDOCURI | | Special Function to access document URI for docs. Either part of the XMLType or translate it to access the ANY_PATH of resource_view |
| Error Functions | | | |
| fn:error( ) | dbms_xquery.raiseError( ) | | |
| fn:trace( ) | dbms_Xquery.trace( ) | | |
| Math functions | | | |
| fn:abs | OPTTAB | | |
| fn:ceiling | OPTTCE | | |
| fn:floor | OPTTFL | | |
| round | OPTTFL(a+0.5) | | May add 0.5 and use floor: May normalize in XQuery to be xf:floor(a+0.5) |
| round-half-to-even | OPTXFLHE | | |
| String functions | | | |
| fn:codepoints-to-string | — | | NLS input needed |
| fn:string-to-codepoint | — | | NLS input needed |
| fn:compare | — | | May be equivalent to having in SQL as case lhs < rhs then −1 else case when lhs = rhs then 0 else 1. |
| fn:concat | OPTTCA | | May map to multiple OPTTCA (SQL takes only 2 args) |
| fn:string-join | OPTXSJOIN | OPTTCO | May do with concat operators, but empty sequence needs to be taken into account. |
| fn:substring | OPTFL(x+0.5), OPTTSS | | Add ROUND to all input args |
| fn:string-length | OPTTLN | | |
| fn:normalize-space | OPTXSOPR | | String operations (normalize space) |
| fn:normalize-unicode | OPTXSOPR | | NLS support |

-continued

| XQuery Operator | SQL mapping | Optimized | Notes |
|---|---|---|---|
| fn:upper-case | OPTTUP | | |
| fn:lower-case | OPTTLO | | |
| fn:translate | OPTTRA | | |
| fn:escape-uri | OPTXSOPR | | String function (Escape URI) |
| Substring functions | | | |
| fn:contains | OPTTFN | | Issue with NULL - XQuery says contains(( ), "") is true; Collation support (NLS) needed |
| fn:starts-with | OPTTSS, OPTFL(x+0.5) | | Substring with position = 1; collation support needed |
| fn:ends-with | OPTTSS, OPTFL(x+0.5) | | Substring with position = LENGTH(arg); collation support needed |
| fn:substring-before | OPTTSS, OPTTFN | | OPTTSS(expr, 1, OPTTFN(expr)); collation support needed |
| fn:substring-after | OPTTSS, OPTTFN | | OPTTSS(expr, OPTTFN(expr)); collation support needed |
| String pattern match | | | |
| fn:matches | OPTRXLIKE | | s flag matches n option; x option needs to be supported in OPTRXLIKE |
| fn:replace | OPTRXRPL | | SQL replacement string uses\number whereas XQuery uses $number to refer to subexpressions. |
| fn:tokenize | OPTXSTKN | | |
| Boolean Operations | | | |
| fn:true | | | |
| fn:false | | | |
| fn:NOT | | | |
| Date operations | | | |
| fn:get-years-from-yearMonthDuration | OPTXTRCT | | |
| fn:get-months-from-yearMonthDuration | OPTXTRCT | | |
| fn:get-days-from-dayTimeDuration | OPTXTRCT | | |
| fn:get-hours-from-dayTimeDuration | OPTXTRCT | | |
| fn:get-minutes-from-dayTimeDuration | OPTXTRCT | | |
| fn:get-seconds-from-dayTimeDuration | OPTXTRCT | | |
| fn:get-year-from-dateTime | OPTXTRCT | | |
| fn:get-month-from-dateTime | OPTXTRCT | | |
| fn:get-day-from-dateTime | OPTXTRCT | | |
| fn:get-hours-from-dateTime | OPTXTRCT | | |
| fn:get-minutes-from-dateTime | OPTXTRCT | | |
| fn:get-seconds-from-dateTime | OPTXTRCT | | |

-continued

| XQuery Operator | SQL mapping | Optimized | Notes |
|---|---|---|---|
| fn:get-timezone-from-dateTime | OPTXTRCT | | Get only TZ Hour |
| fn:get-year-from-date | OPTXTRCT | | |
| fn:get-months-from-date | OPTXTRCT | | |
| fn:get-day-from-date | OPTXTRCT | | |
| fn:get-timezone-from-date | OPTXTRCT | | Get only TZ Hour |
| fn:get-hour-from-time | OPTXTRCT | | |
| fn:get-minutes-from-time | OPTXTRCT | | |
| fn:get-seconds-from-time | OPTXTRCT | | |
| fn:get-timezone-from-time | OPTXTRCT | | Get only TZ Hour |
| fn:adjust-dateTime-to-timezone | OPTADD | | Need a wrapper. May be implemented with existing functions |
| fn:adjust-date-to-timezone | OPTADD | | Oracle doesn't have date+timezone, only timestamp+timezone, date->timestamp, the time portion is midnight |
| fn:adjust-time-to-timezone | OPTADD | | |
| fn:subtract-dateTimes-yielding-yearMonthDuration | OPTTSU | | |
| fn:subtract-dateTimes-yielding-dayTimeDuration QNames | OPTTSU | | |
| fn:resolve-qname | OPTXQNM | | Qname functions |
| fn:expanded-qname | OPTXQNM | | |
| fn:get-local-name-from-QName | OPTXQNM | | |
| fn:get-namespace-uri-from-QName | OPTXQNM | | |
| fn:get-namepace-uri-for-prefix | OPTXQNM | | |
| fn:get-in-scope-prefixes | OPTXQNM | | |
| fn:resolve-uri functions on nodes | OPTXURI | | |
| fn:name | OPTXNODE | | Node operators |
| fn:local-name | OPTXNODE | | |
| fn:namespace-uri | OPTXNODE | | |
| fn:number | OPTXT2SQLT | | |
| fn:lang | OPTXNODE | | |
| fn:root Sequence operations | OPTXNODE | | |

-continued

| XQuery Operator | SQL mapping | Optimized | Notes |
|---|---|---|---|
| fn:zero-or-one | OPTXSOPR | ignored | Check sequence cardinality. If static typing may find that the occurance is zero or one, then this function is ignored. |
| fn:one-or-more | OPTXSOPR | ignored | Check sequence cardinality. If static typing may find that the occurance is one or one, then this function is ignored. |
| fn:exactly-one | OPTXSOPR | ignored | Check sequence cardinality. If static typing may find that the occurance is exactly once, then this function is ignored. |
| fn:boolean | OPTXGEB | ignored | Computes effective Boolean value |
| fn:concatenate | OPTXMLCONC | | XMLConcat( ) may be reused |
| fn:index-of | OPTXSINDX | | |
| fn:empty | IS NULL | | Translated to a NOT NULL on the sequence |
| fn:exists | EXISTS, NOT NULL | | This may be translated into the EXISTS subquery when operating on a query expression or translated to a IS NOT NULL on a variable. |
| fn:distinct-values | OPTXSDIST | | This may be optimized into a select DISTINCT subquery in certain cases. |
| fn:insert-before | OPTXSOPR | | Sequence operation (Insert before) |
| fn:remove | OPTXSOPR | | Sequence operation (remove) |
| fn:reverse | OPTXSOPR | | Sequence operation (reverse) |
| fn:subsequence | OPTXSOPR | | Sequence operation (subsequence) |
| fn:unordered | ignored | | Used by translation component |
| equals | | | |
| fn:deep-equal | OPTXDEEP | | May be done using XMLType map method functions. |
| aggregate functions | | | |
| fn:count | OPTTCO | | |
| fn:avg | OPTTAV | | Need support for collations |
| fn:max | OPTTMX | | -same- |
| fn:min | OPTTMN | | -same- |
| fn:sum | OPTTSUM | | -same- |
| sequence generators | | | |
| fn:id | OPTXNODE | | |
| fn:idref | OPTXNODE | | |
| fn:doc | | | Translated to (select xmlagg(res) from resource__view where equals__path(res, <arg>) = 1) |
| fn:collection | | | Translated to (select xmlagg(res) from resource__view where under__path(res,<arg>) = 1) |
| Context positions | | | |
| fn:position | | | |
| fn:last | | | |
| fn:current-dateTime | STRTCTS | | |
| fn:current-date | STRTCTS | | |
| fn:current-time | STRTCTS | | |
| fn:default-collation | | | |
| fn:implicit-timezone | OPTSESTZ | | |
| Oracle provided functions | | | |
| ora:view | | | Translated to (select xmlagg(xmlelement("ROW", xmlforest(col1, col2 . . . ) from <table-name>) in case of relational tables and no xmlelement("ROW") for XMLType tables. |
| ora:contains | OPTXMLCONT | | |
| ora:sqrt | OPTSQR | | |

The following SQL operators are also provided to perform XQuery related operations: OPTXTYPCHK performs type checking on the input so that it conforms to the given XQuery type (e.g. xs:integer). OPTXATG performs an XPath extraction operation. OPTXT2SQLT is used for casting XML type to SQL (XMLCast (xmltype expr as sqltype). OPTSQL2XMLT is used for casting SQL types to XML (XMLCast (sql-expr as xml-type)).

5.3. Expression Mapping Examples

Some of the common expressions and their mapping are explained with examples in this section.

For example, Repository Queries (doc):

```
for $i in doc("/public/purchaseorder.xml")
where $i/PurchaseOrder/@Id eq 2001
return <PO pono={$i/PurchaseOrder/@Id}/>
which is rewritten to
    select XMLAgg(XMLElement("PO", XMLAttributes(
        XMLCast (OPTXATG( OPTXATG("$i".res, '/
    PurchaseOrder'),'/@Id') as number)
                as "pono")))
    from (select res
            from resource_view
            where equals_path(res,'/public/purchaseorder.xml') = 1)
    "$i" where XMLCast(OPTXATG("$i".res, '/PurchaseOrder/
    @Id') as number) = 2001;
gets rewritten to
    select XMLAgg(XMLElement("PO", XMLAttributes(
        XMLCast(OPTXATG(OPTXATG(res, '/
    PurchaseOrder'), '@Id') as number)
                as "pono")))
    from resource_view
        where equals_path(res, '/public/purchaseorder.xml') = 1
        and XMLCast(OPTXATG(res, '/PurchaseOrder/@Id')
        as number) = 2001;
```

For example, Repository (Collection):

```
for $i in collection("/public")
where $i/PurchaseOrder/@Id gt 2001
return <PO pono={$i/PurchaseOrder/@Id}/>
becomes
    select XMLAgg(XMLElement("PO", XMLAttributes(
        XMLCast(OPTXATG("$i".xmlv, '/PurchaseOrder/
    @Id') as number) as "pono")))
    from table(xmlsequence(select XMLAgg(res) as xmlv
        from resource_view
            where under_path(res, '/public') = 1) "$i"
        where XMLCast(OPTXATG("$i".xmlv, '/PurchaseOrder/@Id') as
        number) > 2001));
```

For example, SQL Table Queries:

```
for $emp in ora:view("EMP"),
        $dept in ora:view("DEPT")
    where $emp/ROW/DEPTNO = $dept/ROW/DEPTNO
    return ($emp/ROW/ENAME, $dept/ROW/DNAME)
becomes
    select XMLAgg(
            XMLConcat(XMLCast(OPTXATG("$emp".xmlv, '/
    ROW/ENAME') as number),
                XMLCast(OPTXATG("$dept".xmlv, '/
    ROW/DNAME') as number)))
    from (select XMLElement("ROW",XMLForest(empno, ename, sal,
    deptno))
                as xmlv
        from emp ) "$emp",
        (select XMLElement("ROW",XMLForest(deptno, dname)
        as xmlv from dept) "$dept"
    where XMLCast(OPTXATG("$emp".xmlv, '/ROW/DEPTNO')
        as number) = XMLCast(OPTXATG("$dept".xmlv, '/
        ROW/DEPTNO) as number);
which gets rewritten into
    select XMLAgg(XMLConcat(e.ename, d.dname))
    from emp e, dept d
    where e.deptno =d.deptno;
```

6.0 Example Alternatives

In the embodiments described herein, XQuery and XQueryX were presented as examples of query languages for querying XML language sources and SQL was presented as an example of a query language for querying relational databases. The techniques are in no way limited to those query languages. Any other query language may be used.

The techniques described herein present unique solutions for efficient evaluation of queries using translation. The techniques, however, are not limited to queries made on markup languages data sources. In other embodiments, any query language may be used. Queries in the query language may then be parsed and compiled into first form of in-memory representation. The first form of in-memory representation may then be converted into a second form of in-memory representation and processed further as described above.

The techniques described herein provide that the various formats of queries are first parsed and compiled into ASTs or other in-memory representations. These in-memory representations are then converted to a particular abstract syntax. In other embodiments, the elements of a query in a first syntax (e.g. XQuery) are parsed, compiled, and immediately converted to the particular format element-by-element. In the embodiment, there may not necessarily exist, at any particular time, an in-memory representation of the entire portion of the query in the first format.

7.0 Hardware Overview

Figure 3:
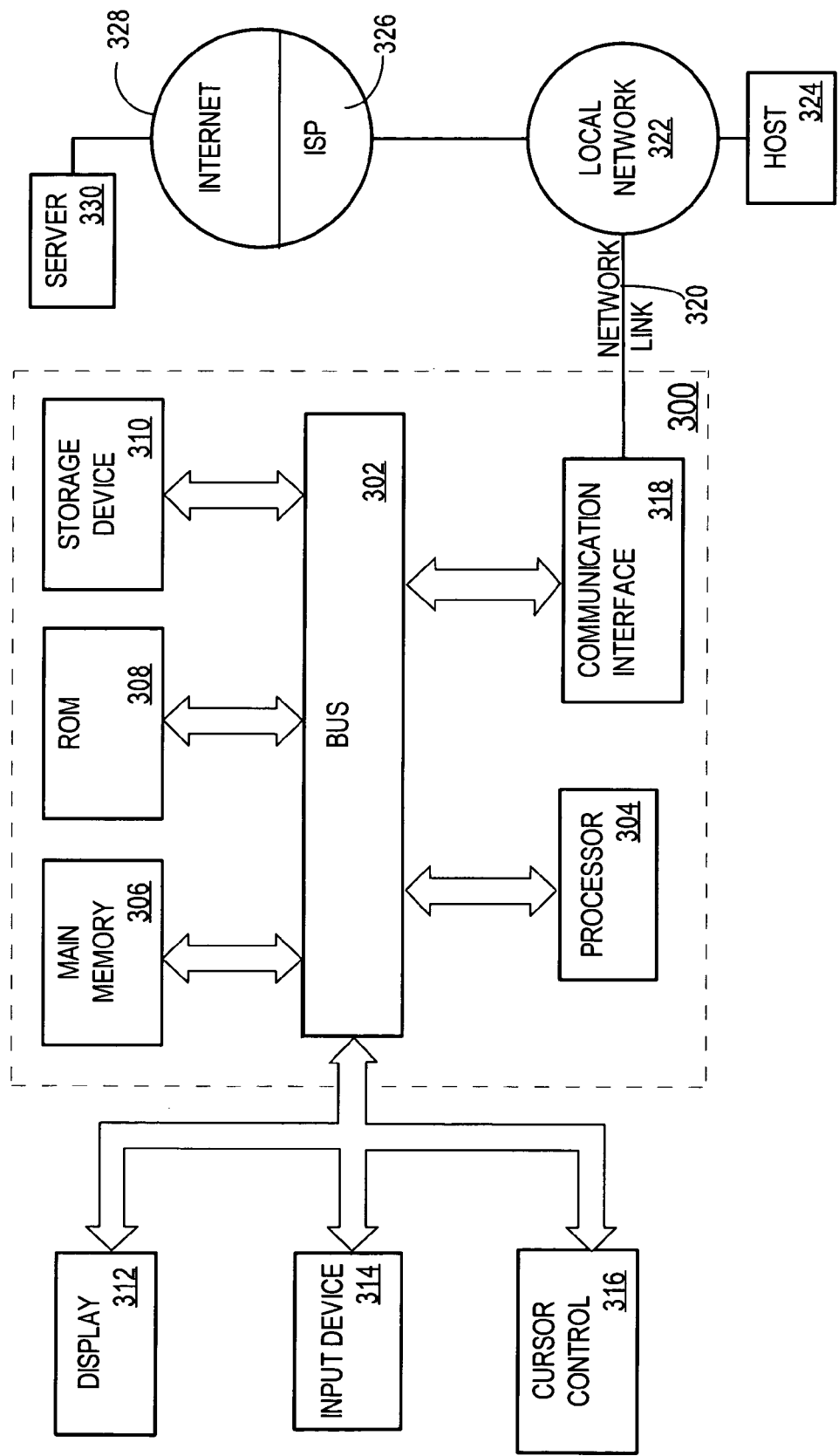
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications.

Common forms of machine-readable storage media include, for example, a floppy disk, a flexible disk, hard disk, magnetic tape, or any other magnetic medium, a CD-ROM, a RAM, a PROM, and EPROM, a FLASH-EPROM, any other memory chip or cartridge, which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

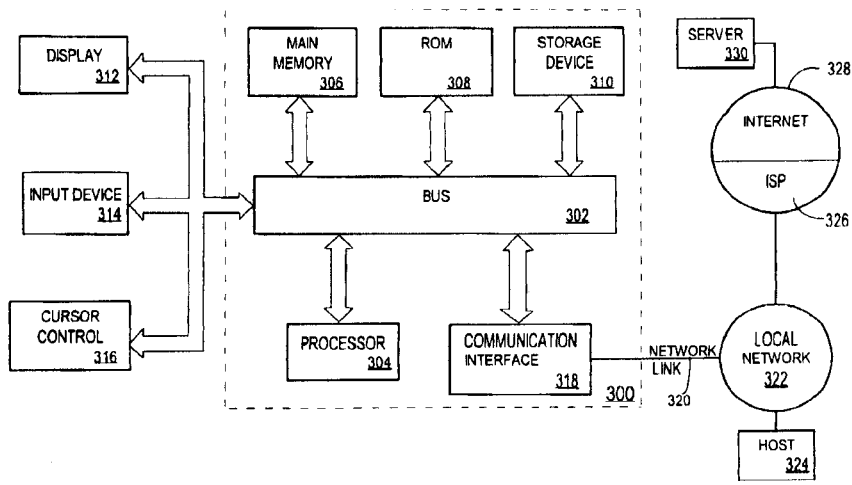

What is claimed is:

1. A method of processing a query, comprising:
   receiving the query, wherein the query specifies operations;
   determining that the query comprises a Structured Query Language (SQL) portion that specifies first one or more of said operations in SQL query language and a markup language portion that specifies second one or more of said operations in a markup query language;
   wherein the markup query language is one of XQuery query language and XQueryX query language;
   wherein, within the query, the markup language portion is embedded into the SQL portion;
   generating a first in-memory representation for the SQL portion;
   generating a second in-memory representation for the markup language portion;
   generating a third in-memory representation of the query based on the first in-memory representation and the second in-memory representation, wherein the third in-memory representation specifies all of said operations; and performing said operations based on the third in-memory representation;
   wherein the first in-memory representation and the third in-memory representation are formatted in a first abstract syntax and the second in-memory representation is formatted in a second abstract syntax, and wherein the step of generating the third in-memory representation comprises:
   generating a fourth in-memory representation in the first abstract syntax based on the second in-memory representation; and
   generating the third in-memory representation based on the first in-memory representation and the fourth in-memory representation;
   wherein the first abstract syntax is an SQL-related abstract syntax and the second abstract syntax is an XQuery-related abstract syntax; and
   wherein the markup language portion comprises a user-defined XQuery function in the second abstract syntax; and wherein the step of generating the fourth in-memory representation comprises generating a user-defined PL/SQL function in the first abstract syntax based on the user-defined XQuery function in the second abstract syntax.

2. The method of claim 1 wherein the second in-memory representation comprises one or more in-memory representations of query elements in the second abstract syntax, and wherein generating the fourth in-memory representation comprises:
   determining a second set of one or more equivalent in-memory representations of query elements in the first abstract syntax for the one or more in-memory representations of query elements in the second abstract syntax; and
   generating the fourth in-memory representation in the first abstract syntax based on the second set of one or more equivalent in-memory representations of query elements in the first abstract syntax.

3. The method of claim 2, wherein each in-memory representation of query elements in the one or more in-memory representations of query elements in the second abstract syntax corresponds to one or more in-memory representation of query elements in the second set of one or more equivalent in-memory representations of query elements in the first abstract syntax.

4. The method of claim 1, wherein one or more of the first in-memory representation, the second in-memory representation, and the third in-memory representation are represented in memory as abstract syntax trees.

5. The method of claim 1, wherein the first abstract syntax is an SQL-related abstract syntax and the second abstract syntax is an XQuery-related abstract syntax; wherein the markup language portion comprises an XQuery aggregation in the second abstract syntax; and wherein the step of generating the fourth in-memory representation comprises generating an SQL subquery in the first abstract syntax to compute the aggregation, said SQL subquery being generated based on the XQuery aggregation in the second abstract syntax.

6. The method of claim 1, wherein the first abstract syntax is an SQL-related abstract syntax and the second abstract syntax is an XQuery-related abstract syntax; wherein the markup language portion comprises a literal expression in the second abstract syntax; and wherein the step of generating the fourth in-memory representation comprises generating an SQL literal in the first abstract syntax based on the literal expression in the second abstract syntax.

7. The method of claim 1, wherein the first abstract syntax is an SQL-related abstract syntax and the second abstract syntax is an XQuery-related abstract syntax; wherein the markup language portion comprises an XQuery cast expression in the second abstract syntax; and wherein the step of generating the fourth in-memory representation comprises generating one of an SQL cast function and an SQL convert function in the first abstract syntax based on the XQuery cast expression in the second abstract syntax.

8. The method of claim 1, wherein the first abstract syntax is an SQL-related abstract syntax and the second abstract syntax is an XQuery-related abstract syntax; wherein the markup language portion comprises a set expressions in the second abstract syntax; and wherein the step of generating the fourth in-memory representation comprises generating one of an SQL UNION, an SQL MINUS, and an SQL INTERSECT in the first abstract syntax based on the set expressions in the second abstract syntax.

9. The method of claim 1, wherein the first abstract syntax is an SQL-related abstract syntax and the second abstract syntax is an XQuery-related abstract syntax; wherein the markup language portion comprises an XQuery arithmetic expression in the second abstract syntax; and wherein the step of generating the fourth in-memory representation comprises generating an SQL arithmetic expression in the first abstract syntax based on the XQuery arithmetic expression in the second abstract syntax.

10. The method of claim 1, wherein the first abstract syntax is an SQL-related abstract syntax and the second abstract syntax is an XQuery-related abstract syntax; wherein the markup language portion comprises an XQuery comparison in the second abstract syntax; and wherein the step of generating the fourth in-memory representation comprises generating an SQL comparison in the first abstract syntax based on the XQuery comparison in the second abstract syntax.

11. The method of claim 1, wherein the first abstract syntax is an SQL-related abstract syntax and the second abstract syntax is an XQuery-related abstract syntax; wherein the markup language portion comprises an XQuery FLWOR order by clause in the second abstract syntax; and wherein the step of generating the fourth in-memory representation comprises generating an SQL order by clause in the first abstract syntax based on the XQuery FLWOR order by clause in the second abstract syntax.

12. The method of claim 1, wherein the first abstract syntax is an SQL-related abstract syntax and the second abstract syntax is an XQuery-related abstract syntax; wherein the markup language portion comprises an XML logical expressions in the second abstract syntax; and wherein the step of generating the fourth in-memory representation comprises generating an SQL logical expressions element in the first abstract syntax based on the XML logical expressions in the second abstract syntax.

13. The method of claim 1, wherein the first abstract syntax is an SQL-related abstract syntax and the second abstract syntax is an XQuery-related abstract syntax; wherein the markup language portion comprises an XML FLWOR expression in the second abstract syntax; and wherein the step of generating the fourth in-memory representation comprises generating an SQL select expressions element in the first abstract syntax based on the XML FLWOR expression in the second abstract syntax.

14. The method of claim 1, wherein the first abstract syntax is an SQL-related abstract syntax and the second abstract syntax is an XQuery-related abstract syntax; wherein the markup language portion comprises an XML Path expression in the second abstract syntax; and wherein the step of generating the fourth in-memory representation comprises generating an SQL path expression in the first abstract syntax based on the XML Path expression in the second abstract syntax.

15. The method of claim 1, wherein the first abstract syntax is an SQL-related abstract syntax and the second abstract syntax is an XQuery-related abstract syntax; wherein the markup language portion comprises an XML if-then-else expression in the second abstract syntax; and wherein the step of generating the fourth in-memory representation comprises generating an SQL case—when expression in the first abstract syntax based on the XML if-then-else expression in the second abstract syntax.

16. The method of claim 1, wherein the first abstract syntax is an SQL-related abstract syntax and the second abstract syntax is an XQuery-related abstract syntax; wherein the markup language portion comprises an XML quantified expression in the second abstract syntax; and wherein the step of generating the fourth in-memory representation comprises generating an SQL Exists expression in the first abstract syntax based on the XML quantified expression in the second abstract syntax.

17. The method of claim 1, wherein the first abstract syntax is an SQL-related abstract syntax and the second abstract syntax is an XQuery-related abstract syntax; wherein the markup language portion comprises an SQL/XML construction expression in the second abstract syntax; and wherein the step of generating the fourth in-memory representation comprises generating an SQL construction expression in the first abstract syntax based on the SQL/XML construction expression in the second abstract syntax.

18. The method of claim 1, wherein the first abstract syntax is an SQL-related abstract syntax and the second abstract syntax is an XQuery-related abstract syntax; wherein the markup language portion comprises an XML operator in the second abstract syntax; and wherein the step of generating the fourth in-memory representation comprises generating an SQL operator in the first abstract syntax based on the XML operator in the second abstract syntax.

19. The method of claim 1, wherein the first abstract syntax is an SQL-related abstract syntax and the second abstract syntax is an XQuery-related abstract syntax; wherein the markup language portion comprises an XQuery sequence type operation in the second abstract syntax; and wherein the step of generating the fourth in-memory representation comprises generating an SQL type operation in the first abstract syntax based on the XQuery sequence type operation in the second abstract syntax.

20. The method of claim 1, wherein the first abstract syntax is an SQL-related abstract syntax and the second abstract syntax is an XQuery-related abstract syntax; wherein the markup language portion comprises an XQuery type constructor in the second abstract syntax; and wherein the step of generating the fourth in-memory representation comprises generating an SQL scalar constructor in the first abstract syntax based on the XQuery type constructor in the second abstract syntax.

21. The method of claim 1, wherein the first abstract syntax is an SQL-related abstract syntax and the second abstract syntax is an XQuery-related abstract syntax; wherein the markup language portion comprises an XQuery validate operation in the second abstract syntax; and wherein the step of generating the fourth in-memory representation comprises generating one of an SQL/XML IsValid operation and an SQL/XML Validate operation in the first abstract syntax based on the XQuery validate operation in the second abstract syntax.

22. The method of claim 1, wherein the first abstract syntax is an SQL-related abstract syntax and the second abstract syntax is an XQuery-related abstract syntax; wherein the markup language portion comprises a polymorphic XQuery arithmetic operator in the second abstract syntax; and wherein the step of generating the fourth in-memory representation comprises generating one of a polymorphic SQL arithmetic operator in the first abstract syntax based on the polymorphic XQuery arithmetic operator in the second abstract syntax.

23. The method of claim 1, wherein the first abstract syntax is an SQL-related abstract syntax and the second abstract syntax is an XQuery-related abstract syntax; wherein the markup language portion comprises a polymorphic XQuery comparison operator in the second abstract syntax; and wherein the step of generating the fourth in-memory representation comprises generating one of a polymorphic SQL value comparison operator in the first abstract syntax based on the polymorphic XQuery comparison operator in the second abstract syntax.

24. The method of claim 1, wherein the first abstract syntax is an SQL-related abstract syntax and the second abstract syntax is an XQuery-related abstract syntax; wherein the markup language portion comprises an XQuery function call in the second abstract syntax; and wherein the step of generating the fourth in-memory representation comprises generating an SQL function call in the first abstract syntax based on the XQuery function call in the second abstract syntax.

25. The method of claim 1, wherein the first abstract syntax is an SQL-related abstract syntax and the second abstract syntax is an XQuery-related abstract syntax; wherein the markup language portion comprises an external XQuery function in the second abstract syntax; and wherein the step of generating the fourth in-memory representation comprises generating an external SQL function in the first abstract syntax based on the external XQuery function in the second abstract syntax.

26. The method of claim 1, wherein the first abstract syntax is an SQL-related abstract syntax and the second abstract syntax is an XQuery-related abstract syntax; wherein the markup language portion comprises an XQuery module in the second abstract syntax; and wherein the step of generating the fourth in-memory representation comprises generating a PL/SQL package in the first abstract syntax based on the XQuery module in the second abstract syntax.

27. A computer-readable storage medium storing one or more sequences of instructions which, when executed by one or more processors, causes the one or more processors to perform the method recited in claim 1.

28. A computer-readable storage medium storing one or more sequences of instructions which, when executed by one or more processors, causes the one or more processors to perform the method recited in claim 2.

29. A computer-readable storage medium storing one or more sequences of instructions which, when executed by one or more processors, causes the one or more processors to perform the method recited in claim 3.

30. A computer-readable storage medium storing one or more sequences of instructions which, when executed by one or more processors, causes the one or more processors to perform the method recited in claim 4.

31. A computer-readable storage medium storing one or more sequences of instructions which, when executed by one or more processors, causes the one or more processors to perform the method recited in claim 5.

32. A computer-readable storage medium storing one or more sequences of instructions which, when executed by one or more processors, causes the one or more processors to perform the method recited in claim 6.

33. A computer-readable storage medium storing one or more sequences of instructions which, when executed by one or more processors, causes the one or more processors to perform the method recited in claim 7.

34. A computer-readable storage medium storing one or more sequences of instructions which, when executed by one or more processors, causes the one or more processors to perform the method recited in claim 8.

35. A computer-readable storage medium storing one or more sequences of instructions which, when executed by one or more processors, causes the one or more processors to perform the method recited in claim 9.

36. A computer-readable storage medium storing one or more sequences of instructions which, when executed by one or more processors, causes the one or more processors to perform the method recited in claim 10.

37. A computer-readable storage medium storing one or more sequences of instructions which, when executed by one or more processors, causes the one or more processors to perform the method recited in claim 11.

38. A computer-readable storage medium storing one or more sequences of instructions which, when executed by one or more processors, causes the one or more processors to perform the method recited in claim 12.

39. A computer-readable storage medium storing one or more sequences of instructions which, when executed by one or more processors, causes the one or more processors to perform the method recited in claim 13.

40. A computer-readable storage medium storing one or more sequences of instructions which, when executed by one or more processors, causes the one or more processors to perform the method recited in claim 14.

41. A computer-readable storage medium storing one or more sequences of instructions which, when executed by one or more processors, causes the one or more processors to perform the method recited in claim 15.

42. A computer-readable storage medium storing one or more sequences of instructions which, when executed by one or more processors, causes the one or more processors to perform the method recited in claim 16.

43. A computer-readable storage medium storing one or more sequences of instructions which, when executed by one or more processors, causes the one or more processors to perform the method recited in claim 17.

44. A computer-readable storage medium storing one or more sequences of instructions which, when executed by one or more processors, causes the one or more processors to perform the method recited in claim 18.

45. A computer-readable storage medium storing one or more sequences of instructions which, when executed by one or more processors, causes the one or more processors to perform the method recited in claim 19.

46. A computer-readable storage medium storing one or more sequences of instructions which, when executed by one or more processors, causes the one or more processors to perform the method recited in claim 20.

47. A computer-readable storage medium storing one or more sequences of instructions which, when executed by one or more processors, causes the one or more processors to perform the method recited in claim 21.

48. A computer-readable storage medium storing one or more sequences of instructions which, when executed by one or more processors, causes the one or more processors to perform the method recited in claim 22.

49. A computer-readable storage medium storing one or more sequences of instructions which, when executed by one or more processors, causes the one or more processors to perform the method recited in claim 23.

50. A computer-readable storage medium storing one or more sequences of instructions which, when executed by one or more processors, causes the one or more processors to perform the method recited in claim 24.

51. A computer-readable storage medium storing one or more sequences of instructions which, when executed by one or more processors, causes the one or more processors to perform the method recited in claim 25.

52. A computer-readable storage medium storing one or more sequences of instructions which, when executed by one or more processors, causes the one or more processors to perform the method recited in claim 26.

53. A method of processing a query, comprising:
receiving the query, wherein the query specifies operations;
determining that the query comprises a first portion that specifies first one or more of the operations in a first query language and a second portion that specifies second one or more of the operations in a second query language;
generating a first in-memory representation for the first portion;
generating a second in-memory representation for the second portion, wherein the second in-memory representation represents at least one query element, supported by the second query language, that is not understood by a query processor for the first query language;
prior to performing any of the operations, generating a third in-memory representation of the query based on the first in-memory representation and a fourth in-memory representation, wherein the third in-memory representation specifies all of the operations, and wherein generating the third in-memory representation comprises:
generating the fourth in-memory representation based on the second in-memory representation, wherein the fourth in-memory representation represents only query elements that are supported by the first query language and understood by a query processor for the first query language; and
performing the operations based on the third in-memory representation;
wherein the first in-memory representation and the third in-memory representation are formatted in an Structure query language (SQL) related abstract syntax or SQL-related abstract syntax and the second in-memory representation is formatted in an XQuery-related abstract syntax, and wherein the fourth in-memory representation is formatted in the SQL-related abstract syntax;
wherein the second portion comprises at least one of:
an XQuery aggregation in the XQuery-related abstract syntax;
a set expression in the XQuery-related abstract syntax;
an XQuery FLWOR order by clause in the XQuery-related abstract syntax;
an XML if-then-else expression in the XQuery-related abstract syntax; or
an XML quantified expression in the XQuery-related abstract syntax.

54. The method of claim 53, wherein:
the second portion comprises an XQuery aggregation in the XQuery-related abstract syntax; and
the step of generating the fourth in-memory representation comprises generating an SQL subquery in the SQL-related abstract syntax to compute the XQuery aggregation, said SQL subquery being generated based on the XQuery aggregation in the XQuery-related abstract syntax.

55. A computer-readable storage medium storing one or more sequences of instructions which, when executed by one or more processors, cause the one or more processors to perform the method recited in claim 54.

56. The method of claim 53, wherein:
the second portion comprises a set expression in the XQuery-related abstract syntax; and
the step of generating the fourth in-memory representation comprises generating one of an SQL UNION, an SQL MINUS, and an SQL INTERSECT in the SQL-related abstract syntax based on the set expressions in the XQuery-related abstract syntax.

57. A computer-readable storage medium storing one or more sequences of instructions which, when executed by one or more processors, cause the one or more processors to perform the method recited in claim 56.

58. The method of claim 53, wherein:
the second portion comprises an XQuery FLWOR order by clause in the XQuery-related abstract syntax; and
the step of generating the fourth in-memory representation comprises generating an SQL order by clause in the SQL-related abstract syntax based on the XQuery FLWOR order by clause in the XQuery-related abstract syntax.

59. A computer-readable storage medium storing one or more sequences of instructions which, when executed by one or more processors, cause the one or more processors to perform the method recited in claim 58.

60. The method of claim 53, wherein:
the second markup language portion comprises an XML if-then-else expression in the XQuery-related abstract syntax; and
the step of generating the fourth in-memory representation comprises generating an SQL case-when expression in the SQL-related abstract syntax based on the XML if-then-else expression in the XQuery-related abstract syntax.

61. A computer-readable storage medium storing one or more sequences of instructions which, when executed by one or more processors, cause the one or more processors to perform the method recited in claim 60.

62. The method of claim 53, wherein:
the second portion comprises an XML quantified expression in the XQuery-related abstract syntax; and
the step of generating the fourth in-memory representation comprises generating an SQL Exists expression in the SQL-related abstract syntax based on the XML quantified expression in the XQuery-related abstract syntax.

63. A computer-readable storage medium storing one or more sequences of instructions which, when executed by one or more processors, cause the one or more processors to perform the method recited in claim 62.

64. A computer-readable storage medium storing one or more sequences of instructions which, when executed by one or more processors, cause the one or more processors to perform the method recited in claim 53.

* * * * *

UNITED STATES PATENT AND TRADEMARK OFFICE
CERTIFICATE OF CORRECTION

PATENT NO. : 7,516,121 B2
APPLICATION NO. : 10/948523
DATED : April 7, 2009
INVENTOR(S) : Liu et al.

It is certified that error appears in the above-identified patent and that said Letters Patent is hereby corrected as shown below:

On face page, in field (56), in column 1, under "U.S. Patent Documents", line 1, below "U.S. Patent Documents" insert -- 4,439,837 03/1984 Aiena et al. -- ; -- 4,536,873 08/1985 Leete -- and -- 5,088,032 02/1992 Bosack --.

On face page, in field (56), in column 1, under "U.S. Patent Documents", line 2, below "5,404,513 A 4/1995 Powers et al." insert -- 5,590,324 12/1996 Leung et al --.

On face page, in field (56), in column 1, under "U.S. Patent Documents", line 3, below "5,878,410 A 3/1999 Zbikowski et al." insert -- 5,905,982 05/1999 Carey et al --.

On page 2, in column 1, under "U.S. Patent Documents", line 21, below "6,510,434 B1 1/2003 Anderson et al." insert -- 6,516,327 02/2003 Zondervan et al. --.

On page 2, in column 1, under "U.S. Patent Documents", line 44, below "7,139,746 B2 11/2006 Shin et al." insert -- 7,171,407 01/2007 Barton et al. --.

On page 2, in column 2, under "U.S. Patent Documents", line 3, below "2003/0158897 A1 8/2003 Ben-Natan et al." insert -- 2003/0167456 A1 09/2003 Sabharwal --.

On page 2, in column 2, under "U.S. Patent Documents", line 19, below "2004/0199524 A1 10/2004 Rys et al." insert -- 2004/0205082 A1 10/2004 Fontoura et al. --.

On page 2, in column 2, under "U.S. Patent Documents", line 39, below "2005/0210002 A1 09/2005 Pal et al." insert -- 2005/0228768 A1 10/2005 Thusoo et al. --.

On page 2, in column 2, under "U.S. Patent Documents", line 45, below "2006/0031204 A1 1/2006 Liu et al." insert -- 2006/0195476 A1 08/2006 Nori et al. --.

On page 3, in column 1, under "Other Publications", line 18, delete "Communications," and insert -- Communication, --, therefor.

Signed and Sealed this

Sixth Day of July, 2010

David J. Kappos
*Director of the United States Patent and Trademark Office*

On page 3, in column 1, under "Other Publications", line 22, delete "vol. 38," and insert -- vol. 28, --, therefor.

On page 3, in column 2, under "Other Publications", line 6, delete "Langauge" and insert -- Language --, therefor.

On page 3, in column 2, under "Other Publications", line 55, delete "XQuery?-" and insert -- XQuery! - --, therefor.

On page 3, in column 2, under "Other Publications", line 73, after "17 pgs." insert the following on a new line:
    -- "JAPANESE PATENT OFFICE, "NOTICE OF GROUNDS OF REJECTION",
    Patent application number 533163/2003, mailed 8/19/08 / received 8/21/08,
    7 pages.

CLAIMS, Patent application number 533163/2003, 9 pages.
    TOMOHARU, ASAMI, "Development of Database System by XML, Relaxer, and
    JDBC", partial English translation, XML Press, Gijutsu-Hyohron Co., July 10, 2001,
    Volume 3, 2 pages.

MAKOTO, ONIZUKA, "XML and Database", partial English translation,
    XML Magazine, Shoeisha Co., Ltd., July 1, 2000, Volume 10, No. 3, 1 page.

HIRONOBU, KOYAKU, "What is brought to SQL Server 2000 by XML?", partial
    English translation, Enterprise Servers, IDG Japan, December 1, 2000, Volume 3,
    No. 12, 1 page." --.

In column 1, line 47, delete "alon" and insert -- al. on --, therefor.

In column 11, line 41, delete "TlMESTAMIP_TZ" and inset -- TIMESTAMP_TZ --, therefor.

In column 13, line 41, delete "LineltemNo" and insert -- LineItemNo --, therefor.

In column 17, line 46, delete "refecencing" and inset -- referencing --, therefor.

In column 19, line 61, after "to a" insert -- . --.

In column 20, line 41, delete "XMLelement" and insert -- XMLElement --, therefor.

In column 22, line 37, delete "Valido" and inset -- Valid() --, therefor.

In column 29-30, line 58, delete "namepace-" and insert -- namespace- --, therefor.

In column 36, line 40, in claim 1, below "portion;" insert -- storing the first in-memory representation in a memory by using a computer; --.

In column 36 and 37, line 64-67 and 1-3, in claim 1, below "abstract syntax; and" delete "wherein the markup language portion comprises a user-defined XQuery function in the second abstract syntax; and wherein the step of generating the fourth in-memory representation comprises generating a user-defined PL/SQL function in the first abstract syntax based on the user-defined XQuery function in the second abstract syntax."
and insert -- wherein the second in-memory representation comprises at least one of:
a user-defined XQuery function in the second abstract syntax;
an XQuery aggregation in the second abstract syntax;
a literal expression in the second abstract syntax;
an XQuery cast expression in the second abstract syntax;
a set expression in the second abstract syntax;
an XQuery arithmetic expression in the second abstract syntax;
an XQuery comparison in the second abstract syntax;
an XQuery FLWOR order by clause in the second abstract syntax;
an XML logical expression in the second abstract syntax;
an XML Path expression in the second abstract syntax;
an XML if-then-else expression in the second abstract syntax;
an XML quantified expression in the second abstract syntax;
an SQL / XML construction expression in the second abstract syntax;
an XML operator in the second abstract syntax;
an XQuery sequence type operation in the second abstract syntax;
an XQuery type constructor in the second abstract syntax;
an XQuery validate operation in the second abstract syntax;
a polymorphic XQuery arithmetic operator in the second abstract syntax;
a polymorphic XQuery comparison operator in the second abstract syntax;
an XQuery function call in the second abstract syntax;
an external XQuery function in the second abstract syntax; or
an XQuery module in the second abstract syntax. --, therefor.

In column 37, line 4, in claim 2, after "1" insert -- , --.

In column 37, line 29-32, in claim 5, delete "first abstract syntax is an SQL-related abstract syntax and the second abstract syntax is an XQuery-related abstract syntax; wherein the markup language portion" and insert -- second in-memory representation --, therefor.

In column 37, line 38-41, in claim 6, delete "first abstract syntax is an SQL-related abstract syntax and the second abstract syntax is an XQuery-related abstract syntax; wherein the markup language portion" and insert -- second in-memory representation --, therefor.

In column 37, line 46-49, in claim 7, delete "first abstract syntax is an SQL-related abstract syntax and the second abstract syntax is an XQuery-related abstract syntax; wherein the markup language portion" and insert -- second in-memory representation --, therefor.

In column 37, line 55-58, in claim 8, delete "first abstract syntax is an SQL-related abstract syntax and the second abstract syntax is an XQuery-related abstract syntax; wherein the markup language portion" and insert -- second in-memory representation --, therefor.

CERTIFICATE OF CORRECTION (continued)
U.S. Pat. No. 7,516,121 B2

In column 37, line 64-67, in claim 9, delete "first abstract syntax is an SQL-related abstract syntax and the second abstract syntax is an XQuery-related abstract syntax; wherein the markup language portion" and insert -- second in-memory representation --, therefor.

In column 38, line 6-9, in claim 10, delete "first abstract syntax is an SQL-related abstract syntax and the second abstract syntax is an XQuery-related abstract syntax; wherein the markup language portion" and insert -- second in-memory representation --, therefor.

In column 38, line 14-17, in claim 11, delete "first abstract syntax is an SQL-related abstract syntax and the second abstract syntax is an XQuery-related abstract syntax; wherein the markup language portion" and insert -- second in-memory representation --, therefor.

In column 38, line 23-26, in claim 12, delete "first abstract syntax is an SQL-related abstract syntax and the second abstract syntax is an XQuery-related abstract syntax; wherein the markup language portion" and insert -- second in-memory representation --, therefor.

In column 38, line 32-35, in claim 13, delete "first abstract syntax is an SQL-related abstract syntax and the second abstract syntax is an XQuery-related abstract syntax; wherein the markup language portion" and insert -- second in-memory representation --, therefor.

In column 38, line 41-44, in claim 14, delete "first abstract syntax is an SQL-related abstract syntax and the second abstract syntax is an XQuery-related abstract syntax; wherein the markup language portion" and insert -- second in-memory representation --, therefor.

In column 38, line 50-54, in claim 15, delete "first abstract syntax is an SQL-related abstract syntax and the second abstract syntax is an XQuery-related abstract syntax; wherein the markup language portion" and insert -- second in-memory representation --, therefor.

In column 38, line 56, in claim 15, delete "case—when" and insert -- case-when --, therefor.

In column 38, line 59-62, in claim 16, delete "first abstract syntax is an SQL-related abstract syntax and the second abstract syntax is an XQuery-related abstract syntax; wherein the markup language portion" and insert -- second in-memory representation --, therefor.

In column 39, line 1-4, in claim 17, delete "first abstract syntax is an SQL-related abstract syntax and the second abstract syntax is an XQuery-related abstract syntax; wherein the markup language portion" and insert -- second in-memory representation --, therefor.

In column 39, line 10-13, in claim 18, delete "first abstract syntax is an SQL-related abstract syntax and the second abstract syntax is an XQuery-related abstract syntax; wherein the markup language portion" and insert -- second in-memory representation --, therefor.

In column 39, line 18-21, in claim 19, delete "first abstract syntax is an SQL-related abstract syntax and the second abstract syntax is an XQuery-related abstract syntax; wherein the markup language portion" and insert -- second in-memory representation --, therefor.

In column 39, line 27-30, in claim 20, delete "first abstract syntax is an SQL-related abstract syntax and the second abstract syntax is an XQuery-related abstract syntax; wherein the markup language portion" and insert -- second in-memory representation --, therefor.

In column 39, line 36-39, in claim 21, delete "first abstract syntax is an SQL-related abstract syntax and the second abstract syntax is an XQuery-related abstract syntax; wherein the markup language portion" and insert -- second in-memory representation --, therefor.

In column 39, line 46-49, in claim 22, delete "first abstract syntax is an SQL-related abstract syntax and the second abstract syntax is an XQuery-related abstract syntax; wherein the markup language portion" and insert -- second in-memory representation --, therefor.

In column 39, line 56-59, in claim 23, delete "first abstract syntax is an SQL-related abstract syntax and the second abstract syntax is an XQuery-related abstract syntax; wherein the markup language portion" and insert -- second in-memory representation --, therefor.

In column 39 and 40, line 66-67 and 1-2, in claim 24, delete "first abstract syntax is an SQL-related abstract syntax and the second abstract syntax is an XQuery-related abstract syntax; wherein the markup language portion" and insert -- second in-memory representation --, therefor.

In column 40, line 7-10, in claim 25, delete "first abstract syntax is an SQL-related abstract syntax and the second abstract syntax is an XQuery-related abstract syntax; wherein the markup language portion" and insert -- second in-memory representation --, therefor.

In column 40, line 16-19, in claim 26, delete "first abstract syntax is an SQL-related abstract syntax and the second abstract syntax is an XQuery-related abstract syntax; wherein the markup language portion" and insert -- second in-memory representation --, therefor.

In column 42, line 6, in claim 53, below "portion:" insert -- storing the first in-memory representation in a memory by using a computer: --.

In column 42, line 22, in claim 53, delete "a" and insert -- the --, therefor.

In column 42, line 27-28, in claim 53, before "SQL-" delete "Structure query language (SQL) related abstract syntax or".

In column 42, line 33, in claim 53, delete "portion" and insert -- in-memory representation --, therefor.

In column 42, line 44, in claim 54, delete "portion" and insert -- in-memory representation --, therefor.

In column 42, line 57, in claim 56, delete "portion" and insert -- in-memory representation --, therefor.

In column 42, line 57, in claim 56, delete "expression" and insert -- expressions --, therefor.

In column 43, line 2, in claim 58, delete "portion" and insert -- in-memory representation --, therefor.

CERTIFICATE OF CORRECTION (continued)
U.S. Pat. No. 7,516,121 B2

In column 43, line 14, in claim 60, delete "markup language portion" and insert -- in-memory representation --, therefor.

In column 44, line 6, in claim 62, delete "portion" and insert -- in-memory representation --, therefor.

In column 44, line 20, below "Claim 64" insert
-- 65. The method of Claim 1, wherein the second in-memory representation comprises a user-defined XQuery function in the second abstract syntax; and wherein the step of generating the fourth in-memory representation comprises generating a user-defined PL/SQL function in the first abstract syntax based on the user-defined XQuery function in the second abstract syntax.

66. A computer-readable storage medium storing one or more sequences of instructions which, when executed by one or more processors, cause the one or more processors to perform the method recited in Claim 65. --.

UNITED STATES PATENT AND TRADEMARK OFFICE
CERTIFICATE OF CORRECTION

| | |
|---|---|
| PATENT NO. | : 7,516,121 B2 |
| APPLICATION NO. | : 10/948523 |
| DATED | : April 7, 2009 |
| INVENTOR(S) | : Liu et al. |

It is certified that error appears in the above-identified patent and that said Letters Patent is hereby corrected as shown below:

Delete the title page and substitute therefor the attached title page showing the corrected number of claims in patent.

On face page, in field (56), in column 1, under "U.S. Patent Documents", line 1, below "U.S. Patent Documents" insert -- 4,439,837 03/1984 Aiena et al. -- ; -- 4,536,873 08/1985 Leete -- and -- 5,088,032 02/1992 Bosack --.

On face page, in field (56), in column 1, under "U.S. Patent Documents", line 2, below "5,404,513 A 4/1995 Powers et al." insert -- 5,590,324 12/1996 Leung et al --.

On face page, in field (56), in column 1, under "U.S. Patent Documents", line 3, below "5,878,410 A 3/1999 Zbikowski et al." insert -- 5,905,982 05/1999 Carey et al --.

On page 2, in column 1, under "U.S. Patent Documents", line 21, below "6,510,434 B1 1/2003 Anderson et al." insert -- 6,516,327 02/2003 Zondervan et al. --.

On page 2, in column 1, under "U.S. Patent Documents", line 44, below "7,139,746 B2 11/2006 Shin et al." insert -- 7,171,407 01/2007 Barton et al. --.

On page 2, in column 2, under "U.S. Patent Documents", line 3, below "2003/0158897 A1 8/2003 Ben-Natan et al." insert -- 2003/0167456 A1 09/2003 Sabharwal --.

On page 2, in column 2, under "U.S. Patent Documents", line 19, below "2004/0199524 A1 10/2004 Rys et al." insert -- 2004/0205082 A1 10/2004 Fontoura et al. --.

On page 2, in column 2, under "U.S. Patent Documents", line 39, below "2005/0210002 A1 09/2005 Pal et al." insert -- 2005/0228768 A1 10/2005 Thusoo et al. --.

This certificate supersedes the Certificate of Correction issued July 6, 2010.

Signed and Sealed this

Tenth Day of August, 2010

David J. Kappos
*Director of the United States Patent and Trademark Office*

CERTIFICATE OF CORRECTION (continued)
U.S. Pat. No. 7,516,121 B2

On page 2, in column 2, under "U.S. Patent Documents", line 45, below "2006/0031204 A1 1/2006 Liu et al." insert -- 2006/0195476 A1 08/2006 Nori et al. --.

On page 3, in column 1, under "Other Publications", line 18, delete "Communications," and insert -- Communication, --, therefor.

On page 3, in column 1, under "Other Publications", line 22, delete "vol. 38," and insert -- vol. 28, --, therefor.

On page 3, in column 2, under "Other Publications", line 6, delete "Langauge" and insert -- Language --, therefor.

On page 3, in column 2, under "Other Publications", line 55, delete "XQuery?-" and insert -- XQuery! - --, therefor.

On page 3, in column 2, under "Other Publications", line 73, after "17 pgs." insert the following on a new line:
   -- "JAPANESE PATENT OFFICE, "NOTICE OF GROUNDS OF REJECTION",
   Patent application number 533163/2003, mailed 8/19/08 / received 8/21/08,
   7 pages.

CLAIMS, Patent application number 533163/2003, 9 pages.
   TOMOHARU, ASAMI, "Development of Database System by XML, Relaxer, and
   JDBC", partial English translation, XML Press, Gijutsu-Hyohron Co., July 10, 2001,
   Volume 3, 2 pages.

MAKOTO, ONIZUKA, "XML and Database", partial English translation,
   XML Magazine, Shoeisha Co., Ltd., July 1, 2000, Volume 10, No. 3, 1 page.

HIRONOBU, KOYAKU, "What is brought to SQL Server 2000 by XML?", partial
   English translation, Enterprise Servers, IDG Japan, December 1, 2000, Volume 3,
   No. 12, 1 page." --.

In column 1, line 47, delete "alon" and insert -- al. on --, therefor.

In column 11, line 41, delete "TIMESTAMIP_TZ" and insert -- TIMESTAMP_TZ --, therefor.

In column 13, line 41, delete "LineItemNo" and insert -- LineItemNo --, therefor.

In column 17, line 46, delete "refecencing" and insert -- referencing --, therefor.

In column 19, line 61, after "to a" insert -- . --.

In column 20, line 41, delete "XMLelement" and insert -- XMLElement --, therefor.

CERTIFICATE OF CORRECTION (continued)
U.S. Pat. No. 7,516,121 B2

In column 22, line 37, delete "Valido" and insert -- Valid() --, therefor.

In column 29-30, line 58, delete "namepace-" and insert -- namespace- --, therefor.

In column 36, line 40, in claim 1, below "portion;" insert -- storing the first in-memory representation in a memory by using a computer; --.

In column 36 and 37, line 64-67 and 1-3, in claim 1, below "abstract syntax; and" delete "wherein the markup language portion comprises a user-defined XQuery function in the second abstract syntax; and wherein the step of generating the fourth in-memory representation comprises generating a user-defined PL/SQL function in the first abstract syntax based on the user-defined XQuery function in the second abstract syntax."
and insert -- wherein the second in-memory representation comprises at least one of:
a user-defined XQuery function in the second abstract syntax;
an XQuery aggregation in the second abstract syntax;
a literal expression in the second abstract syntax;
an XQuery cast expression in the second abstract syntax;
a set expression in the second abstract syntax;
an XQuery arithmetic expression in the second abstract syntax;
an XQuery comparison in the second abstract syntax;
an XQuery FLWOR order by clause in the second abstract syntax;
an XML logical expression in the second abstract syntax;
an XML Path expression in the second abstract syntax;
an XML if-then-else expression in the second abstract syntax;
an XML quantified expression in the second abstract syntax;
an SQL / XML construction expression in the second abstract syntax;
an XML operator in the second abstract syntax;
an XQuery sequence type operation in the second abstract syntax;
an XQuery type constructor in the second abstract syntax;
an XQuery validate operation in the second abstract syntax;
a polymorphic XQuery arithmetic operator in the second abstract syntax;
a polymorphic XQuery comparison operator in the second abstract syntax;
an XQuery function call in the second abstract syntax;
an external XQuery function in the second abstract syntax; or
an XQuery module in the second abstract syntax. --, therefor.

In column 37, line 4, in claim 2, after "1" insert -- , --.

In column 37, line 29-32, in claim 5, delete "first abstract syntax is an SQL-related abstract syntax and the second abstract syntax is an XQuery-related abstract syntax; wherein the markup language portion" and insert -- second in-memory representation --, therefor.

In column 37, line 38-41, in claim 6, delete "first abstract syntax is an SQL-related abstract syntax and the second abstract syntax is an XQuery-related abstract syntax; wherein the markup language portion" and insert -- second in-memory representation --, therefor.

CERTIFICATE OF CORRECTION (continued)
U.S. Pat. No. 7,516,121 B2

In column 37, line 46-49, in claim 7, delete "first abstract syntax is an SQL-related abstract syntax and the second abstract syntax is an XQuery-related abstract syntax; wherein the markup language portion" and insert -- second in-memory representation --, therefor.

In column 37, line 55-58, in claim 8, delete "first abstract syntax is an SQL-related abstract syntax and the second abstract syntax is an XQuery-related abstract syntax; wherein the markup language portion" and insert -- second in-memory representation --, therefor.

In column 37, line 64-67, in claim 9, delete "first abstract syntax is an SQL-related abstract syntax and the second abstract syntax is an XQuery-related abstract syntax; wherein the markup language portion" and insert -- second in-memory representation --, therefor.

In column 38, line 6-9, in claim 10, delete "first abstract syntax is an SQL-related abstract syntax and the second abstract syntax is an XQuery-related abstract syntax; wherein the markup language portion" and insert -- second in-memory representation --, therefor.

In column 38, line 14-17, in claim 11, delete "first abstract syntax is an SQL-related abstract syntax and the second abstract syntax is an XQuery-related abstract syntax; wherein the markup language portion" and insert -- second in-memory representation --, therefor.

In column 38, line 23-26, in claim 12, delete "first abstract syntax is an SQL-related abstract syntax and the second abstract syntax is an XQuery-related abstract syntax; wherein the markup language portion" and insert -- second in-memory representation --, therefor.

In column 38, line 32-35, in claim 13, delete "first abstract syntax is an SQL-related abstract syntax and the second abstract syntax is an XQuery-related abstract syntax; wherein the markup language portion" and insert -- second in-memory representation --, therefor.

In column 38, line 41-44, in claim 14, delete "first abstract syntax is an SQL-related abstract syntax and the second abstract syntax is an XQuery-related abstract syntax; wherein the markup language portion" and insert -- second in-memory representation --, therefor.

In column 38, line 50-54, in claim 15, delete "first abstract syntax is an SQL-related abstract syntax and the second abstract syntax is an XQuery-related abstract syntax; wherein the markup language portion" and insert -- second in-memory representation --, therefor.

In column 38, line 56, in claim 15, delete "case—when" and insert -- case-when --, therefor.

In column 38, line 59-62, in claim 16, delete "first abstract syntax is an SQL-related abstract syntax and the second abstract syntax is an XQuery-related abstract syntax; wherein the markup language portion" and insert -- second in-memory representation --, therefor.

In column 39, line 1-4, in claim 17, delete "first abstract syntax is an SQL-related abstract syntax and the second abstract syntax is an XQuery-related abstract syntax; wherein the markup language portion" and insert -- second in-memory representation --, therefor.

In column 39, line 10-13, in claim 18, delete "first abstract syntax is an SQL-related abstract syntax and the second abstract syntax is an XQuery-related abstract syntax; wherein the markup language portion" and insert -- second in-memory representation --, therefor.

In column 39, line 18-21, in claim 19, delete "first abstract syntax is an SQL-related abstract syntax and the second abstract syntax is an XQuery-related abstract syntax; wherein the markup language portion" and insert -- second in-memory representation --, therefor.

In column 39, line 27-30, in claim 20, delete "first abstract syntax is an SQL-related abstract syntax and the second abstract syntax is an XQuery-related abstract syntax; wherein the markup language portion" and insert -- second in-memory representation --, therefor.

In column 39, line 36-39, in claim 21, delete "first abstract syntax is an SQL-related abstract syntax and the second abstract syntax is an XQuery-related abstract syntax; wherein the markup language portion" and insert -- second in-memory representation --, therefor.

In column 39, line 46-49, in claim 22, delete "first abstract syntax is an SQL-related abstract syntax and the second abstract syntax is an XQuery-related abstract syntax; wherein the markup language portion" and insert -- second in-memory representation --, therefor.

In column 39, line 56-59, in claim 23, delete "first abstract syntax is an SQL-related abstract syntax and the second abstract syntax is an XQuery-related abstract syntax; wherein the markup language portion" and insert -- second in-memory representation --, therefor.

In column 39 and 40, line 66-67 and 1-2, in claim 24, delete "first abstract syntax is an SQL-related abstract syntax and the second abstract syntax is an XQuery-related abstract syntax; wherein the markup language portion" and insert -- second in-memory representation --, therefor.

In column 40, line 7-10, in claim 25, delete "first abstract syntax is an SQL-related abstract syntax and the second abstract syntax is an XQuery-related abstract syntax; wherein the markup language portion" and insert -- second in-memory representation --, therefor.

In column 40, line 16-19, in claim 26, delete "first abstract syntax is an SQL-related abstract syntax and the second abstract syntax is an XQuery-related abstract syntax; wherein the markup language portion" and insert -- second in-memory representation --, therefor.

In column 42, line 6, in claim 53, below "portion:" insert -- storing the first in-memory representation in a memory by using a computer: --.

In column 42, line 22, in claim 53, delete "a" and insert -- the --, therefor.

In column 42, line 27-28, in claim 53, before "SQL-" delete "Structure query language (SQL) related abstract syntax or".

In column 42, line 33, in claim 53, delete "portion" and insert -- in-memory representation --, therefor.

In column 42, line 44, in claim 54, delete "portion" and insert -- in-memory representation --, therefor.

In column 42, line 57, in claim 56, delete "portion" and insert -- in-memory representation --, therefor.

In column 42, line 57, in claim 56, delete "expression" and insert -- expressions --, therefor.

In column 43, line 2, in claim 58, delete "portion" and insert -- in-memory representation --, therefor.

In column 43, line 14, in claim 60, delete "markup language portion" and insert -- in-memory representation --, therefor.

In column 44, line 6, in claim 62, delete "portion" and insert -- in-memory representation --, therefor.

In column 44, line 20, below "Claim 64" insert
-- 65. The method of Claim 1, wherein the second in-memory representation comprises a user-defined XQuery function in the second abstract syntax; and wherein the step of generating the fourth in-memory representation comprises generating a user-defined PL/SQL function in the first abstract syntax based on the user-defined XQuery function in the second abstract syntax.

66. A computer-readable storage medium storing one or more sequences of instructions which, when executed by one or more processors, cause the one or more processors to perform the method recited in Claim 65. --.

CERTIFICATE OF CORRECTION (continued)

(12) United States Patent
Liu et al.

(10) Patent No.: US 7,516,121 B2
(45) Date of Patent: Apr. 7, 2009

(54) EFFICIENT EVALUATION OF QUERIES USING TRANSLATION

(75) Inventors: Zhen Hua Liu, San Mateo, CA (US); Muralidhar Krishnaprasad, Fremont, CA (US); Anand Manikutty, Foster City, CA (US); James Warner, Mountain View, CA (US); Hui X. Zhang, Fremont, CA (US); Vikas Arora, San Francisco, CA (US); Susan M. Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 126 days.

(21) Appl. No.: 10/948,523

(22) Filed: Sep. 22, 2004

(65) Prior Publication Data
US 2005/0289125 A1      Dec. 29, 2005

Related U.S. Application Data

(60) Provisional application No. 60/582,706, filed on Jun. 23, 2004, provisional application No. 60/599,652, filed on Aug. 5, 2004, provisional application No. 60/599,319, filed on Aug. 6, 2004.

(51) Int. Cl.
G06F 17/30      (2006.01)
(52) U.S. Cl. .................................. 707/3; 707/2; 707/4
(58) Field of Classification Search ................ 707/100
See application file for complete search history.

(56) References Cited

U.S. PATENT DOCUMENTS

| | | | |
|---|---|---|---|
| 5,404,513 A | 4/1995 | Powers et al. | |
| 5,680,614 A | 10/1997 | Bakuya et al. | |
| 5,878,410 A | 3/1999 | Zbikowski et al. | |
| 5,974,407 A | 10/1999 | Sacks | |
| 5,999,941 A | 12/1999 | Andersen | |
| 6,012,067 A | 1/2000 | Sarkar | |
| 6,055,544 A | 4/2000 | DeRose et al. | |

(Continued)

FOREIGN PATENT DOCUMENTS

EP      1 241 589 A2      9/2002

(Continued)

OTHER PUBLICATIONS

Peng, Feng et al., "XPath queries on streaming data", 2003, ACM Press, pp. 431-442.

(Continued)

*Primary Examiner*—Truong Cam Y
*Assistant Examiner*—Shyue Jiunn Hwa
(74) *Attorney, Agent, or Firm*—Hickman Palermo Truong & Becker LLP

(57) ABSTRACT

Techniques are provided for processing a query including receiving the query, where the query specifies certain operations; determining that the query includes a first portion in a first query language and a second portion in a second query language; generating a first in-memory representation for the first portion; generating a second in-memory representation for the second portion; generating a third in-memory representation of the query based on the first in-memory representation and the second in-memory representation; and performing the certain operations based on the third in-memory representation.

66 Claims, 3 Drawing Sheets